Jan. 23, 1968  L. R. PADBERG, JR  3,364,708
ELECTRICAL DISCHARGE METHOD OF AND APPARATUS
FOR GENERATING SHOCK WAVES IN WATER
Filed July 13, 1960  30 Sheets-Sheet 1

*INVENTOR.*
LOUIS R. PADBERG JR.
BY
George E. Pearson
ATTORNEY

Jan. 23, 1968  L. R. PADBERG, JR  3,364,708
ELECTRICAL DISCHARGE METHOD OF AND APPARATUS
FOR GENERATING SHOCK WAVES IN WATER
Filed July 18, 1960  30 Sheets-Sheet 2
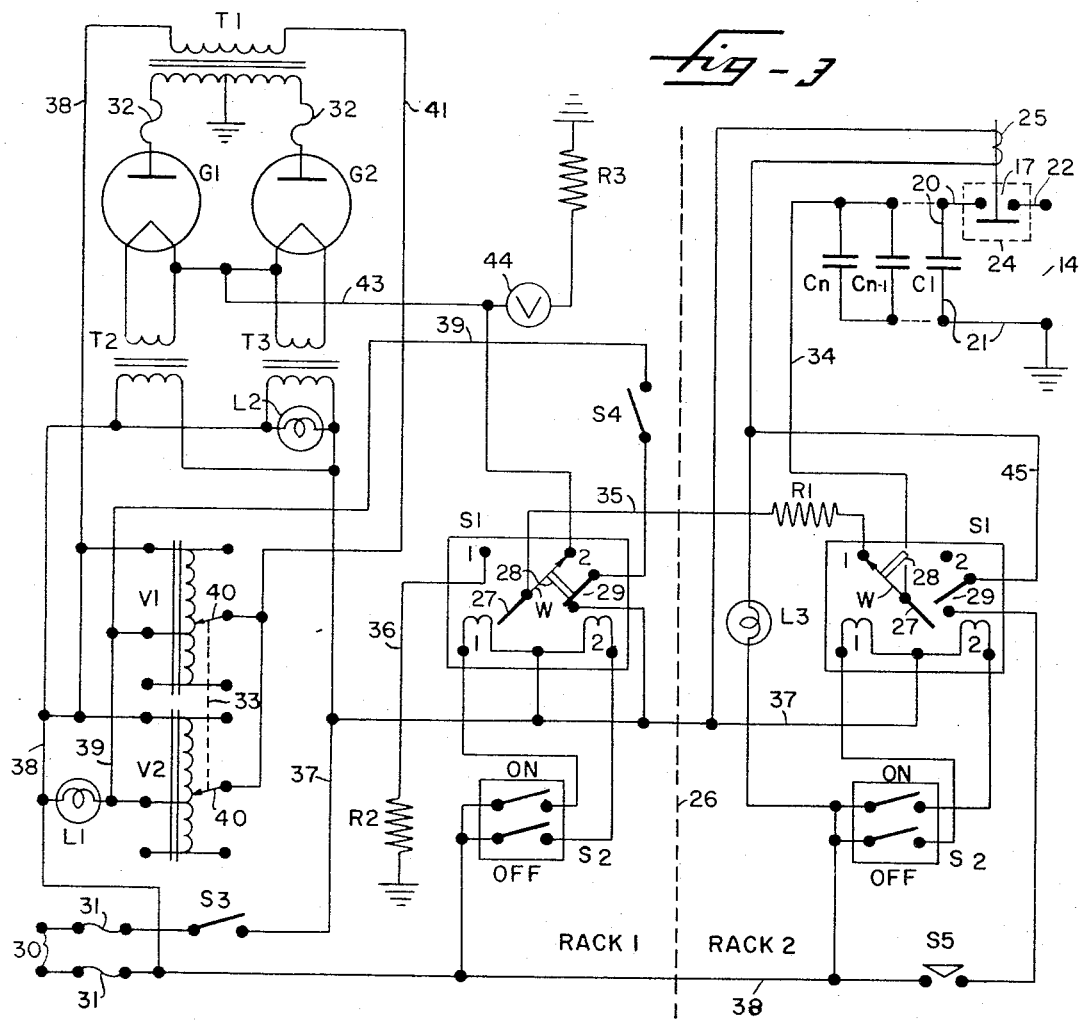
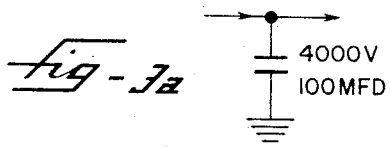
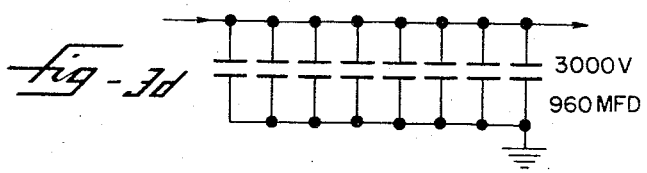
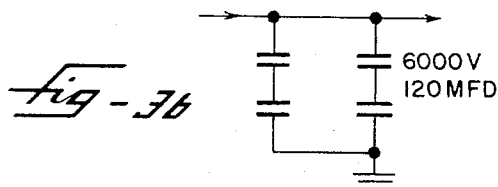
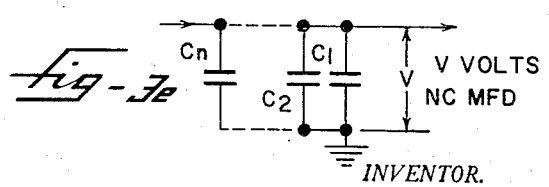
*INVENTOR.*
LOUIS R. PADBERG JR.
George E. Pearson
ATTORNEY INVENTOR
LOUIS R. PADBERG JR.
BY
George E. Pearson
ATTORNEY Jan. 23, 1968　　　　L. R. PADBERG, JR　　　3,364,708
ELECTRICAL DISCHARGE METHOD OF AND APPARATUS
FOR GENERATING SHOCK WAVES IN WATER
Filed July 18, 1960　　　　　　　　　　　　　50 Sheets-Sheet 4

INVENTOR
LOUIS R. PADBERG JR.
BY
George E. Pearson
ATTORNEY

Jan. 23, 1968   L. R. PADBERG, JR   3,364,708
ELECTRICAL DISCHARGE METHOD OF AND APPARATUS
FOR GENERATING SHOCK WAVES IN WATER
Filed July 18, 1960   30 Sheets-Sheet 5
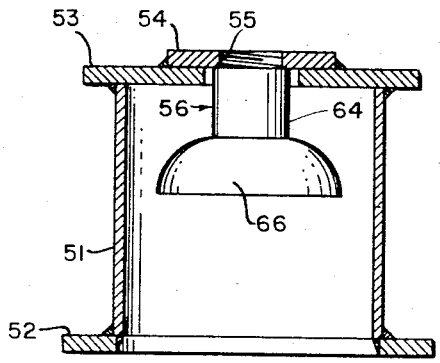
fig-7
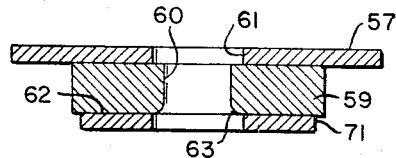
fig-11
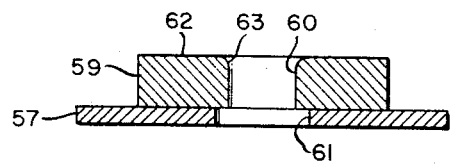
fig-8
fig-10
DISTANCE FROM ELECTRODE TO BLANK
| | | 1 1/2" | 3" | 4 1/2" | 6" |
|---|---|---|---|---|---|
| FLAT FACE ELECTRODE |  |  | | |  |
fig-31a
| 6" CONCAVE SPHERICAL RADIUS ELECTRODE FACE |  |  |
|---|---|---|
fig-31b
| 12" CONCAVE SPHERICAL RADIUS ELECTRODE FACE |  | 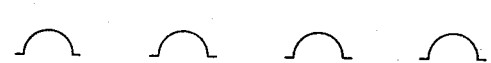 |
|---|---|---|
fig-31c
| 12" CONVEX SPHERICAL RADIUS ELECTRODE FACE |  |  |
|---|---|---|
fig-31d
INVENTOR.
LOUIS R. PADBERG JR.
BY
George E. Pearson
ATTORNEY Jan. 23, 1968 L. R. PADBERG, JR 3,364,708
ELECTRICAL DISCHARGE METHOD OF AND APPARATUS
FOR GENERATING SHOCK WAVES IN WATER
Filed July 18, 1960 30 Sheets-Sheet 6

INVENTOR.
LOUIS R. PADBERG JR.
BY
George E. Pearson
ATTORNEY

Jan. 23, 1968 L. R. PADBERG, JR 3,364,708
ELECTRICAL DISCHARGE METHOD OF AND APPARATUS
FOR GENERATING SHOCK WAVES IN WATER
Filed July 18, 1960 30 Sheets-Sheet 7
FIG. 9b
ELECTRICAL DISCHARGE FORMING
2500 VOLTS
400 WATT SECONDS
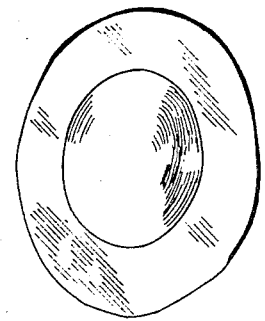
.032 x 5D 2024 AL
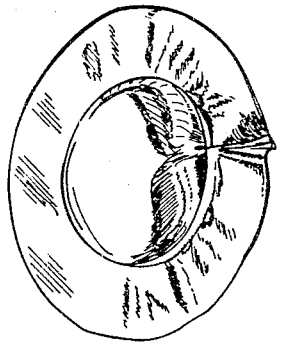
.016 x 5 D 2024 AL
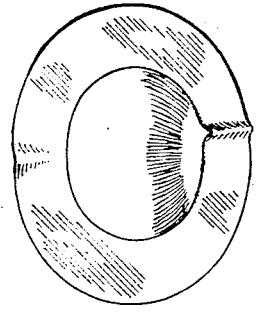
.025 x 5 D 2024 AL
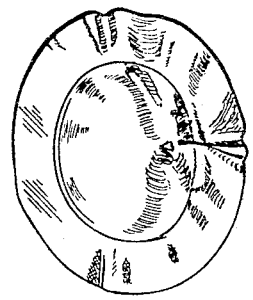
.016 x 4 D 2024 AL
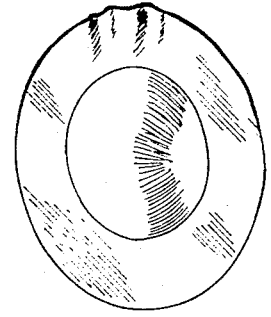
.020 x 5 D 2024 AL
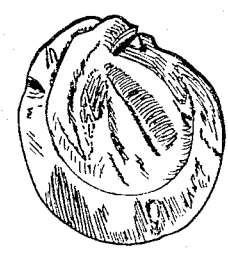
.016 x 3 1/2 D 2024 AL
INVENTOR.
LOUIS R. PADBERG JR.
BY
George E. Pearson
ATTORNEY INVENTOR.
LOUIS R. PADBERG JR.
BY George E. Pearson
ATTORNEY INVENTOR.
LOUIS R. PADBERG JR.
BY
George E. Pearson
ATTORNEY

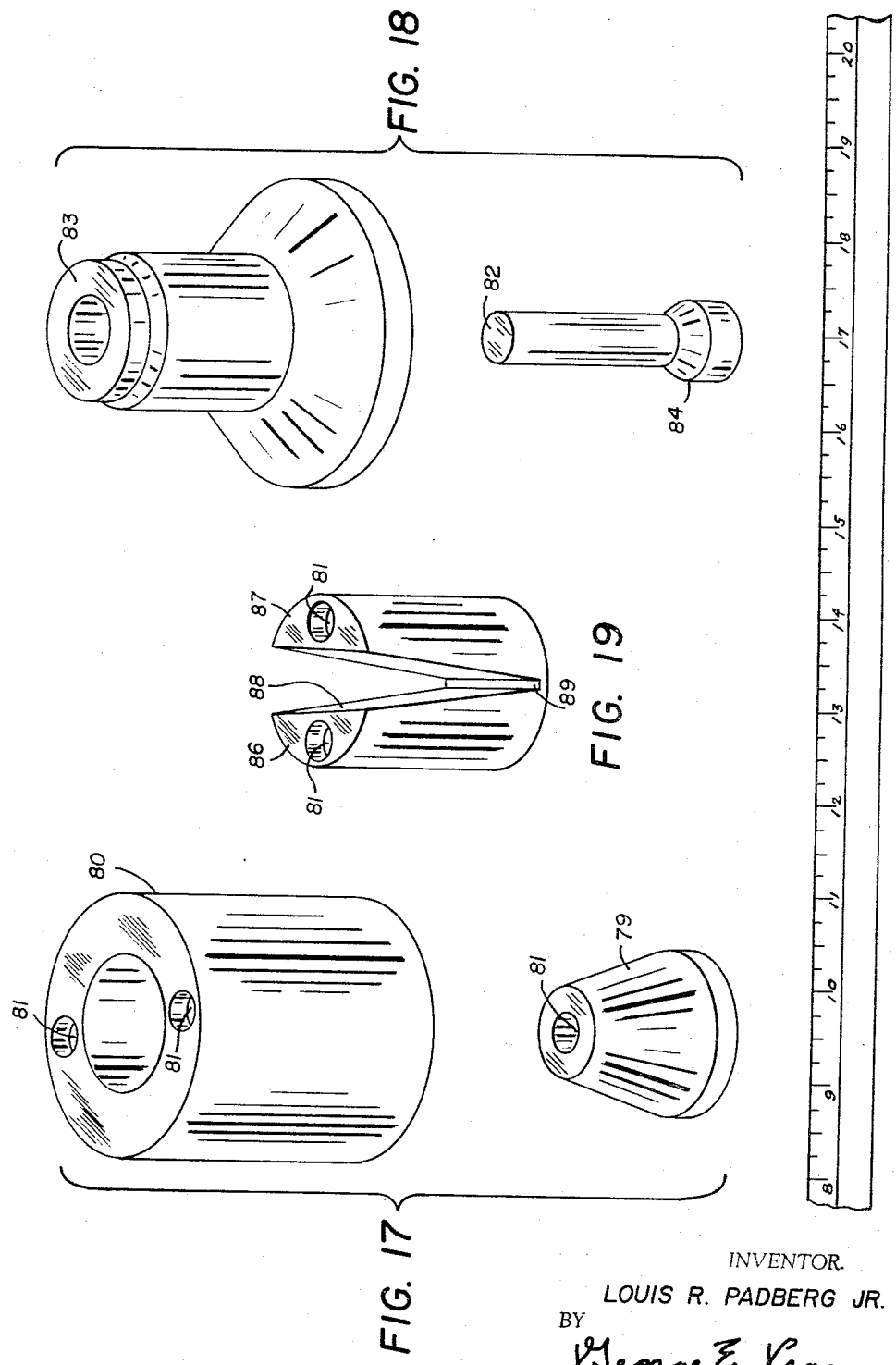

Jan. 23, 1968 L. R. PADBERG, JR 3,364,708
ELECTRICAL DISCHARGE METHOD OF AND APPARATUS
FOR GENERATING SHOCK WAVES IN WATER
Filed July 13, 1960 30 Sheets-Sheet 11

INVENTOR
LOUIS R. PADBERG JR.
BY
George E. Pearson
ATTORNEY

INVENTOR
LOUIS R. PADBERG JR.
BY
George E. Pearson
ATTORNEY

6" FROM ELECTRODES
OF TRANSDUCER 78
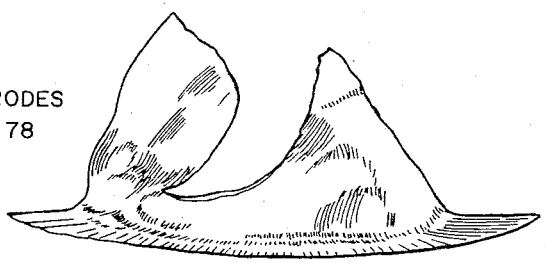
4 1/2" FROM ELECTRODES
OF TRANSDUCER 78
15/16
3" FROM ELECTRODES
OF TRANSDUCER 78
25/32
1 1/2" FROM ELECTRODES
OF TRANSDUCER 78
1/2
4 1/2" FROM ELECTRODES
OF TRANSDUCER 56
13/32
*FIG. 23*
INVENTOR.
LOUIS R. PADBERG JR.
BY
*George E. Pearson*
ATTORNEY Jan. 23, 1968    L. R. PADBERG, JR    3,364,708
ELECTRICAL DISCHARGE METHOD OF AND APPARATUS
FOR GENERATING SHOCK WAVES IN WATER
Filed July 13, 1960    30 Sheets-Sheet 17
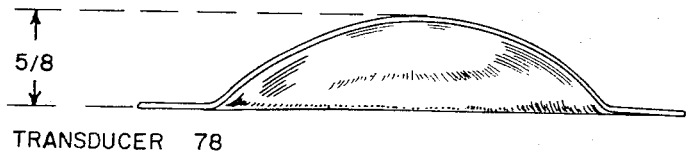
5/8
TRANSDUCER 78
17/32
TRANSDUCER 76
FIG. 26
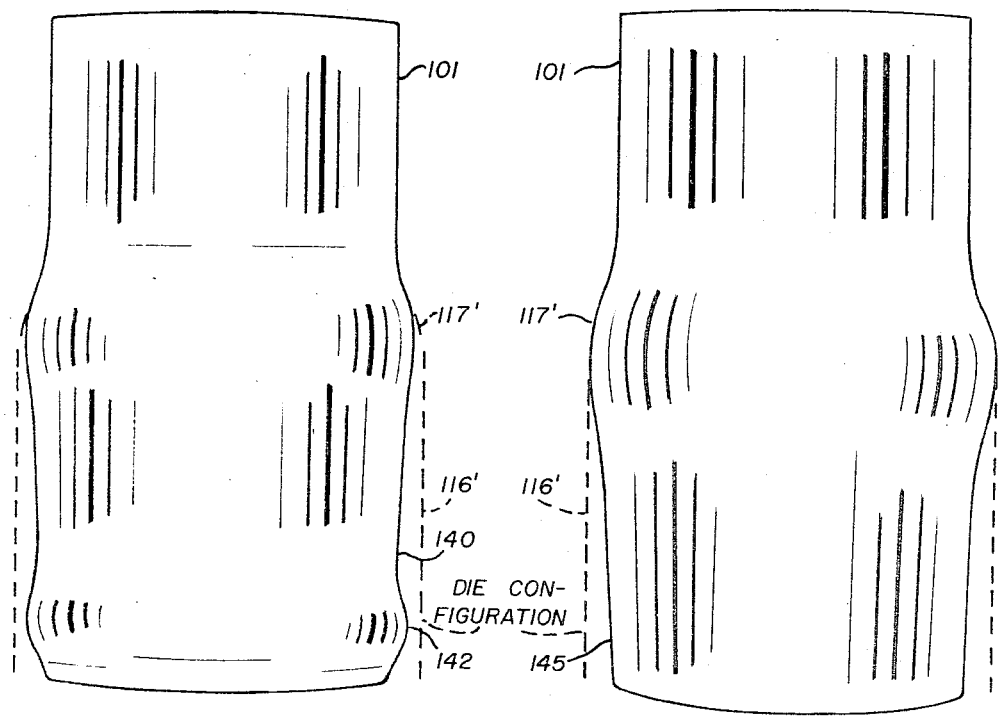
FIG. 41    FIG. 42
INVENTOR.
LOUIS R. PADBERG JR.
BY
George E. Pearson
ATTORNEY Jan. 23, 1968     L. R. PADBERG, JR     3,364,708
ELECTRICAL DISCHARGE METHOD OF AND APPARATUS
FOR GENERATING SHOCK WAVES IN WATER
Filed July 18, 1960     30 Sheets-Sheet 18
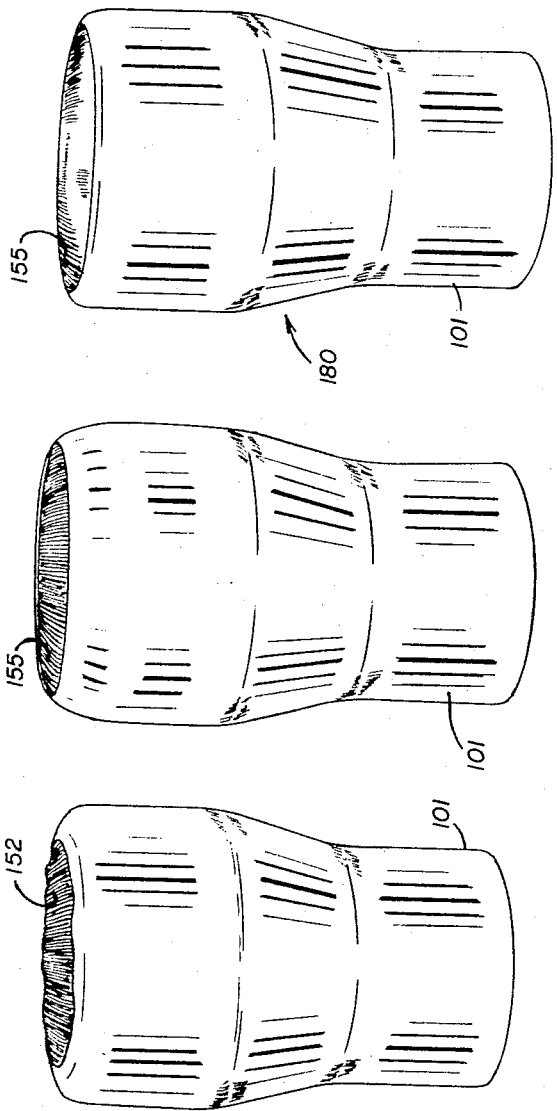
*FIG. 51*
*FIG. 50*
*FIG. 49*
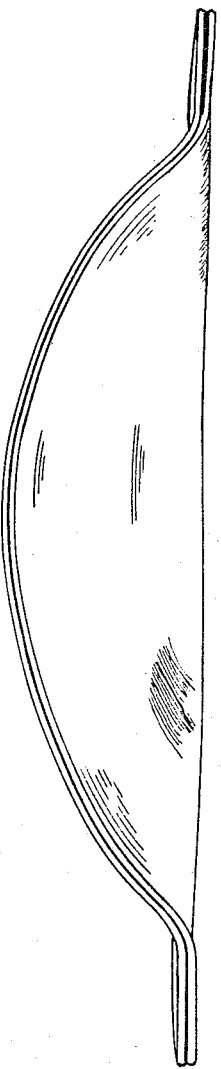
*FIG. 27*
INVENTOR.
LOUIS R. PADBERG JR.
BY
*George E. Pearson*
ATTORNEY INVENTOR.
LOUIS R. PADBERG JR.
BY
George E. Pearson
ATTORNEY

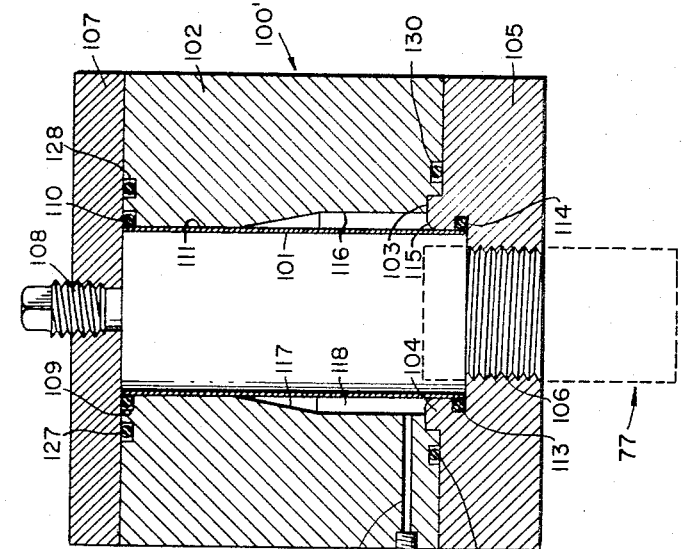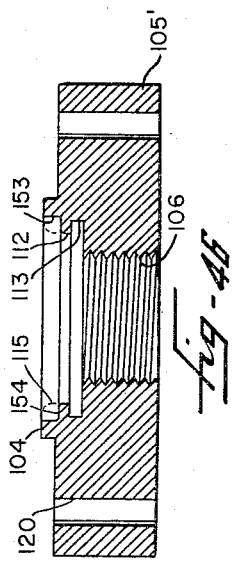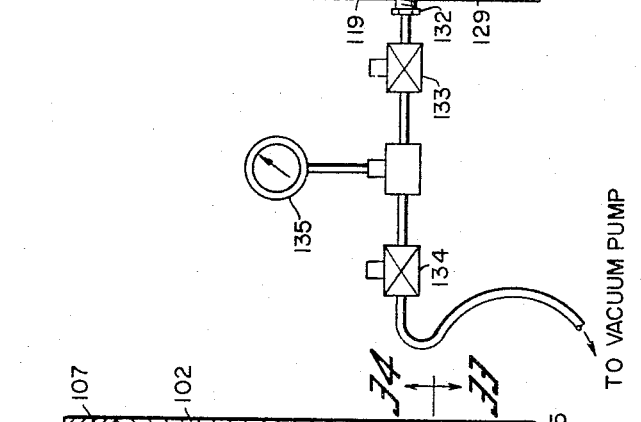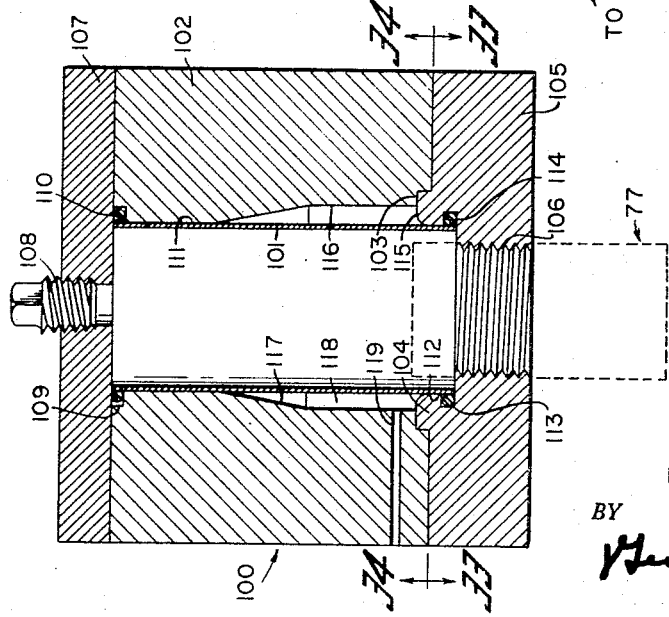

INVENTOR.
LOUIS R. PADBERG JR.
BY
George E. Pearson
ATTORNEY

INVENTOR.
LOUIS R. PADBERG JR.
BY George E. Pearson
ATTORNEY

Jan. 23, 1968 L. R. PADBERG, JR 3,364,708
ELECTRICAL DISCHARGE METHOD OF AND APPARATUS
FOR GENERATING SHOCK WAVES IN WATER
Filed July 13, 1960 30 Sheets-Sheet 25

INVENTOR.
LOUIS R. PADBERG JR.
BY
George E. Pearson
ATTORNEY

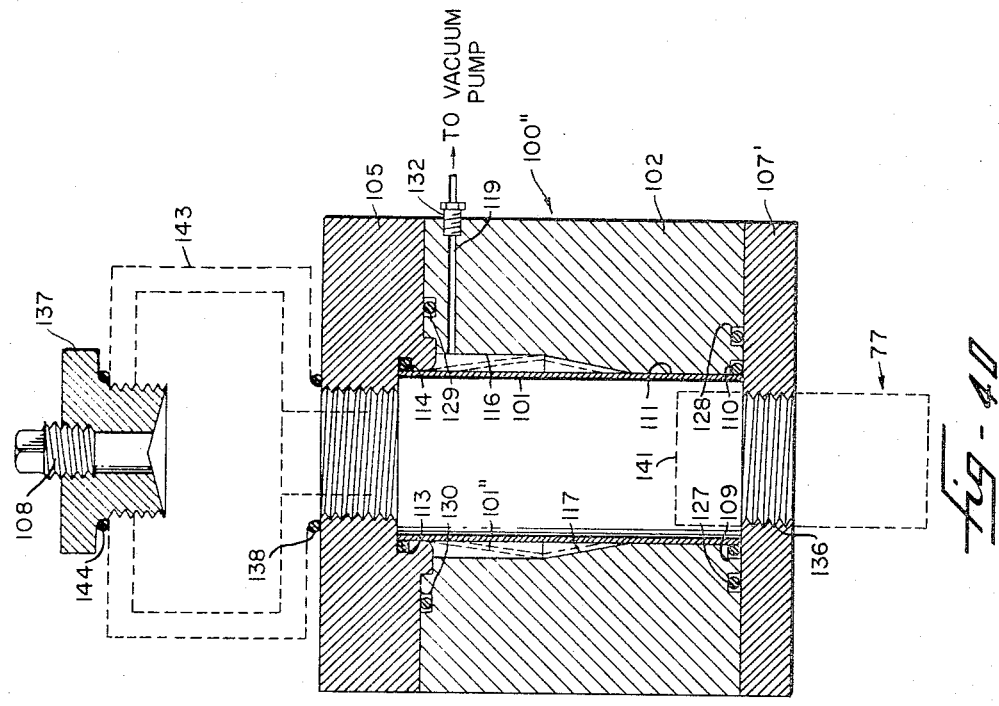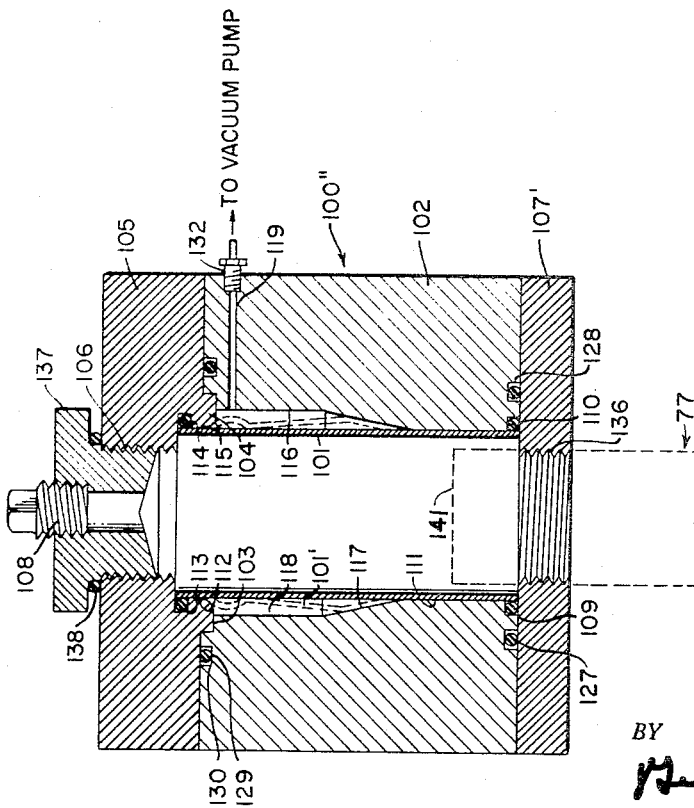

INVENTOR.
LOUIS R. PADBERG JR.
BY
George E. Pearson
ATTORNEY

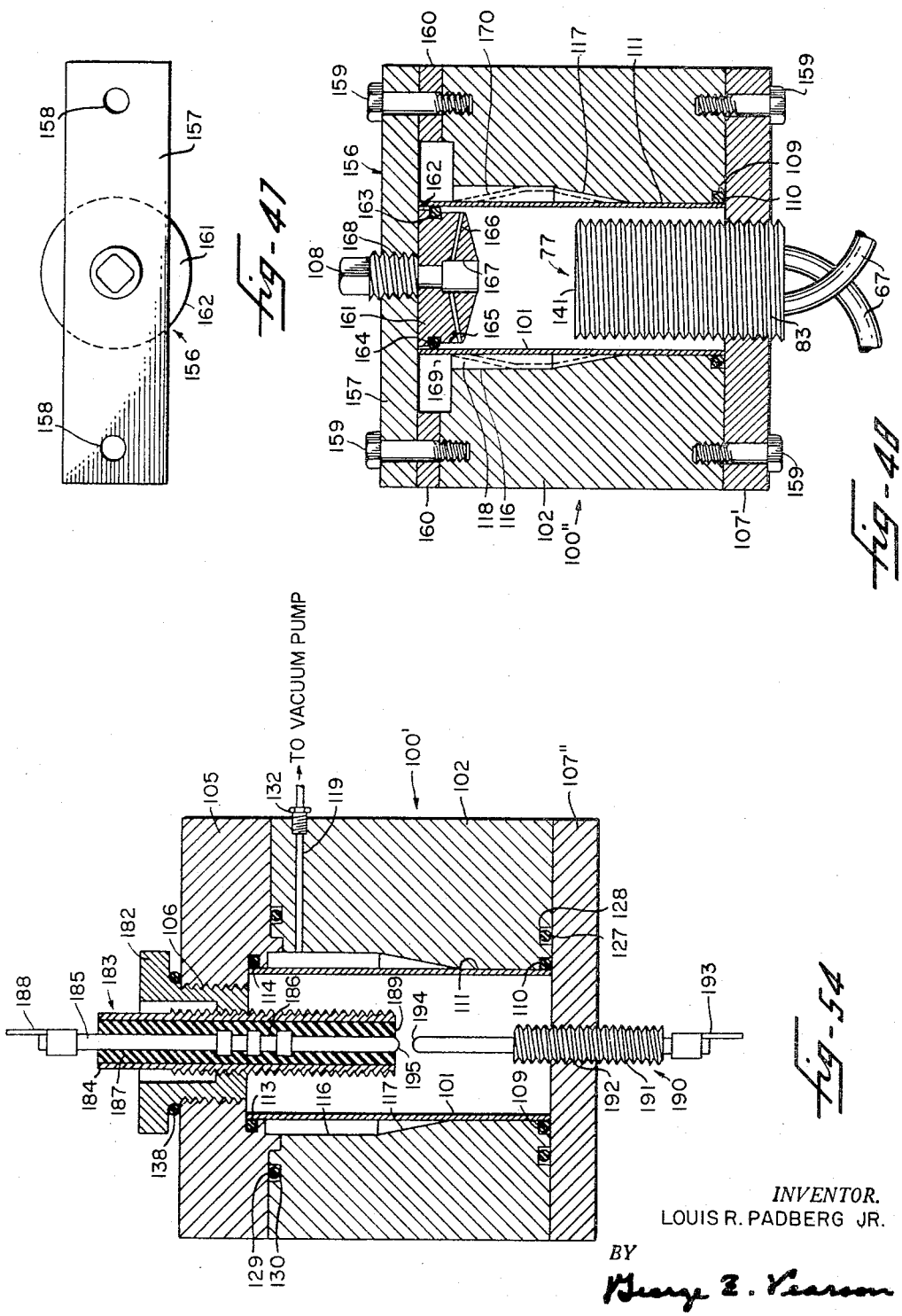

Jan. 23, 1968 L. R. PADBERG, JR 3,364,708
ELECTRICAL DISCHARGE METHOD OF AND APPARATUS
FOR GENERATING SHOCK WAVES IN WATER
Filed July 13, 1960 50 Sheets-Sheet 50

INVENTOR.
LOUIS R. PADBERG JR.
BY
*George E. Pearson*
ATTORNEY 3,364,708
ELECTRICAL DISCHARGE METHOD OF AND APPARATUS FOR GENERATING SHOCK WAVES IN WATER
Louis R. Padberg, Jr., San Diego, Calif., assignor to Rohr Corporation, Chula Vista, Calif., a corporation of California
Continuation-in-part of application Ser. No. 558,812, Jan. 12, 1956. This application July 18, 1960, Ser. No. 43,580
19 Claims. (Cl. 72—56)

This invention relates generally to the discharge of electrical energy in water and to the generation by this means of shock waves having a level of intensity and steep wave front comparable to those obtainable in the use of explosives.

This invention in one form thereof relates to unidirectional high level low frequency sound sources such as disclosed and claimed in my co-pending application for Uni-Directional High Level Low Frequency Sound Source, Ser. No. 558,812 filed Jan. 12, 1956, now Patent No. 3,007,133, of which the instant application is a continuation-in-part, and wherein means in underwater applications are employed for generating a high intensity sound having a steep wave front whereby the signal is sharp and intense, such as that generated by an explosive. One such prior art instrument for producing explosion induced shock waves is known as a cone ring. A dynamite cap and a length of Primacord is detonated along the axis of the ring which, because of its mechanical configuration gives a series of shock waves which forms a wave train lasting for a very short period of time. Thus a frequency results which is dependent upon the time duration of the wave and the number of rings in the device. While this device produces the desired energy level, much of the energy is lost in unwanted directions, it takes time to repeat the process and there is always danger in the handling of explosives.

In prior art devices using an electrical spark across a gap between electrodes, these electrodes are housed in a container of fresh or distilled water or other fluid of high resistance. The fluid and electrodes form a capacitor charged by a current. The spark results from the condenser-breakdown effect between the two electrodes, producing energy which is exerted against a diaphragm in the chamber. Transmitting through an intervening diaphragm results in less efficiency. The spark resulting from the condenser-breakdown effect is accomplished with relatively small capacitors and a very high voltage. Since high potentials are always more dangerous, particularly in water, safety precuations must be observed.

The device comprising the present invention, as disclosed in my copending application aforesaid, consists of a shock ring assembly and an arrangement of spark gaps placed along the axis of a large cone reflector. The surrounding fluid such as sea water is used to initially make electrical contact between the electrodes. This "short" causes current to flow momentarily, heating the water in the gap between the electrodes. The temperature at the gap becomes very high momentarily, causing the water to be vaporized. A gas bubble is formed which expands and collapses resulting in the generation of a shock wave at the beginning and end of the bubble. The duration of this pulse is extremely short.

In this form of the invention a line of spark gaps is arranged along ths axis of a cone made up of ring reflectors. As the shock waves pass through these rings additional shock waves are set up and the net result is a train of shock waves. The direction of propagation is mainly out the apex of the cone. In order to gain additional directivity so that the arrangement is unidirectional, the ring assembly is placed along the axis of a larger cone reflector. The outer reflector is backed with an acoustic material which prevents the sound from passing through. The desired low frequency can be derived by proper selection of the number of rings, by varying the spacing of the rings, and by controlling the duration of the pulse train. By using lower potentials with very large capacitors in genearting the spark, the equipment is safer to handle.

In my co-pending application aforesaid, there is thus disclosed a method and apparatus suitable for developing an electrical discharge of energy of sufficient intensity and rate of discharge to form an expanding and collapsing gas bubble within the water with accompanying shock waves comparable to those generated by the use of explosives. This co-pending application, moreover, discloses and teaches the critical parameters which must be observed in order to obtain bubble formation and shock wave generation of desired intensity level and wave front and, to this end, teaches that the electrical energy at the required level be capacitively stored and critically discharged at high voltage and current levels. Also emphasized are the appropriate relationships which must obtain between the storage capacitance and that of the spark gap as determined, for example, by the shape and size of the gap electrodes, the impedance of the discharge path in relation to that of the spark gap, as well as other factors and parameters.

The invention as disclosed by way of example in the co-pending application has particular utility in providing a high intensity low-frequency sound source for use in underwater applications, such as seismic explorations and the like, it being desirable in such case to convert a single shock wave into a wave train having definite frequency characteristics.

In the instant application which, as aforenoted, is a continuation-in-part of my copending application aforesaid, a different form of the invention is disclosed and claimed wherein the novel bubble formation and resultant shock waves are disclosed as having particular utility in the forming of sheet metal to desired configurations.

In the forming of metal by the shock waves accompanying an underwater electrical discharge, the construction and electrical characteristics of the gap and the position of the gap in relation to the part to be formed are very critical and necessarily may vary in accordance with the configuration, gage, and metal type of different parts to be formed. Accordingly, provision is made for variable spacing of the gap and focussing of the shock waves relative to the work.

Much of the success of an underwater spark discharge of high level intensity is directly related to the gap itself, and the shape, size, spacing and electrical insulation of the electrodes, in turn, have a considerable bearing upon the operation of the spark gap. For a gap, which is virtually shorted by the conductive water therein, to work efficiently, it must offer the principal resistance in the discharge circuit and this must be high in accordance with Ohm's Law which states that the power into the load is equal to the current squared times the resistance. Difficulty arises in making the resistance of the shorted gap high, however, and this has been found to be accomplished best when the gap space is made wide and the electrodes recessed in a high dielectric material. Materials with good dielectric characteristics, however, usually have poor shock resistance and crack when subjected to the shock waves accompanying the high level electrical discharge in water. This allows water to enter the cracks and set up spurious leakage paths between the electrodes such that the energy is discharged internally instead of at the desired point in the gap between the electrodes.

Since the energy dissipated during the breakdown is directly proportional to the capacitance discharged in accordance with the law $$E = \frac{CV^2}{2}$$

it should be desirable to have as high a capacitance as possible. The higher the capacitance, however, the lower the resistance of the gap must be in order to discharge the stored energy in a specific time interval in accordance with the time constant expression T equals resistance×capacitance ($T=RC$).

The greatest shock wave results when the stored energy is discharged or dumped quickly and this, therefore, makes the time constant RC a critical parameter. Most capacitors, moreover, have considerable internal inductance which opposes the sudden release of energy therefrom and, for this reason, the time and rate of discharge will be further controlled in accordance with the time constant expression T equals the ratio of inductance to resistance ($T=L/R$). While the stored energy increases as the square of the voltage as compared to the capacitance with which it varies only linearly, increased capacitance lowers the effective capacitive reactance of the discharge circuit and tends to bring the same into or near resonance with the low order of inductive reactance permitted or inherent in the circuit. At or near resonance, of course, the resistance only substantially impedes the discharge of energy across the gap. For metal forming applications, it is essential to keep inductance of the capacitors and of their leads down to a very minimum, for the foregoing and additional reasons hereinafter more fully to appear.

The generation of shock waves of explosive intensity in water as a result of the sudden dumping or discharge of tremendous electrical energy into a virtual short-circuit therein thus depends most critically on the parameters of the gap and the discharge path. The gap is the most critical and next in order of criticalness is the switch for transferring the stored energy to the gap. Open-type and related prior art switches are entirely inadequate. Required for the purpose is a high voltage, high-current type of switch in which the switch is enclosed in a vacuum which eliminates the noise of the spark as well as reduces sparking and switch impedance to a minimum.

Additional safety features such as assuring complete discharge of the capacitor bank during periods of non-use of the apparatus, preventing inadvertent flow of the discharge current, and preventing application of plate voltage to the rectifier tubes prior to energization of their filaments, are provided in the use of high-speed relays as will more fully appear as the description proceeds. A heavy back-surge follows the sudden discharge of electrical energy into the gap and provision is further made in the form of such a high speed relay, for example, to prevent damage to high voltage rectifiers employed in the charging circuit for the storage capacitor.

An object of the invention is to electrically generate shock waves in water having a level of intensity and steep wave front comparable to those obtainable in the use of explosives.

Another object is to generate such shock waves by the discharge of electrical energy within the water.

Another object of the present invention is to provide a high intensity low frequency source for use in seismic exploration and underwater applications.

Another object is the provision of a sound source for generating sound having a steep wave front, whereby the signal is sharp and intense, such as that generated by explosives.

Another object is to discharge the electrical energy through a predetermined path within the water and with such high level of intensity and rapid rate of discharge as to generate a rapidly expanding and collapsing gas bubble with accompanying shock waves simulating those receivable from explosives.

Another object is to provide apparatus for generating explosive forces in water by means other than the use of explosives and which may be operated repeatedly at will without disturbing the apparatus to prepare it for the next operation.

Another object resides in the provision of new and improved means for effecting predetermined parametrical relationships between the electrical discharge paths disposed respectively within and without the water such as is productive of generating explosive simulating shock waves therein.

A further object resides in the provision of new and improved methods and means for focussing the electrically generated shock waves in water to give the same predetermined directivity.

Still another object is to provide new and improved methods and means for forming sheet metal by electrically generated shock waves in water.

Still another object is to provide new and improved methods and means for focussing the electrically generated shock waves in relation to a sheet of metal to be formed thereby.

Yet another object is to form sheet metal to desired configuration by shock waves directed thereto through the medium of water in which the sheet metal is immersed and in which the shock waves are generated by the discharge of electrical energy therein.

Still a further object of the present invention resides in the provision of a method and apparatus for forming production parts by converting electrical energy into shock waves which through the medium of water forces the part into a die.

Still other objects, features and advantages of the present invention are those inherent in or to be implied from the novel construction combination and arrangement of parts constituting the best mode thus far devised for practicing the principles of the invention as will become more fully understood as the description proceeds, reference being had to the accompanying drawings wherein:

FIG. 3 is a schematic view of a complete electrical system suitable for charging and discharging the electrical energy required for the generation of shock waves in water;

FIGS. 3a to 3e are schematic diagrams illustrating various storage capacitor circuit arrangements for the energy bank of FIG. 3;

FIGS. 7 and 8 are sectional views of the apparatus of FIG. 4 and respectively showing the electrical discharge chamber and its die supporting cover;

FIGS. 9a and 9b are views depicting opposite sides of several parts formed by electrical discharge in the apparatus of FIG. 4 and disclosing comparatively how the formation of the several parts varies with the gage of the sheet metal;

FIGS. 10 and 11 are sectional views similar to those of FIGS. 7 and 8, respectively, and illustrating modifications of the apparatus disclosed therein;

Figure 12:
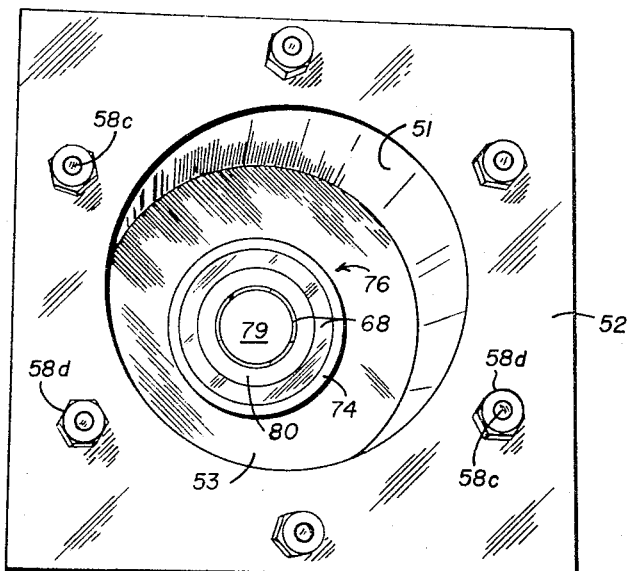
FIGS. 12 and 13 are views in perspective of the modified electric discharge chamber and its cover as disclosed in section in FIGS. 10 and 11 respectively.
Figure 13:
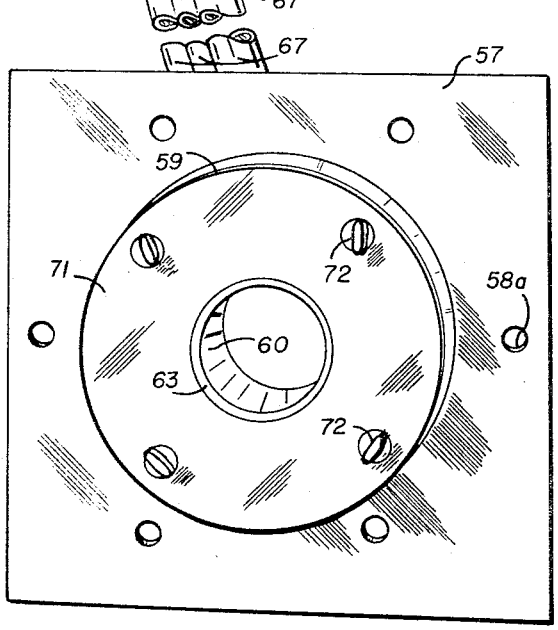
Figure 14:
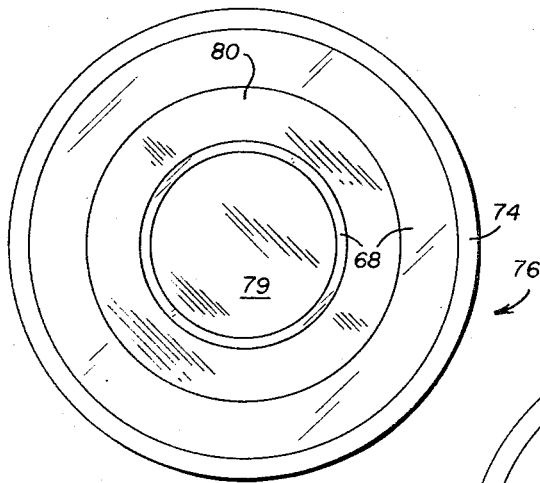
Figure 15:
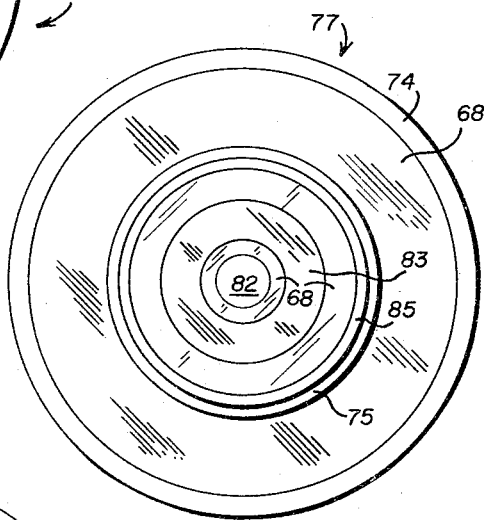
Figure 16:
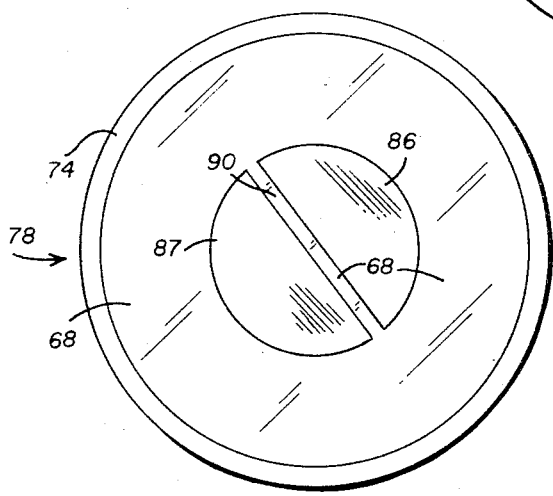
Figure 20:
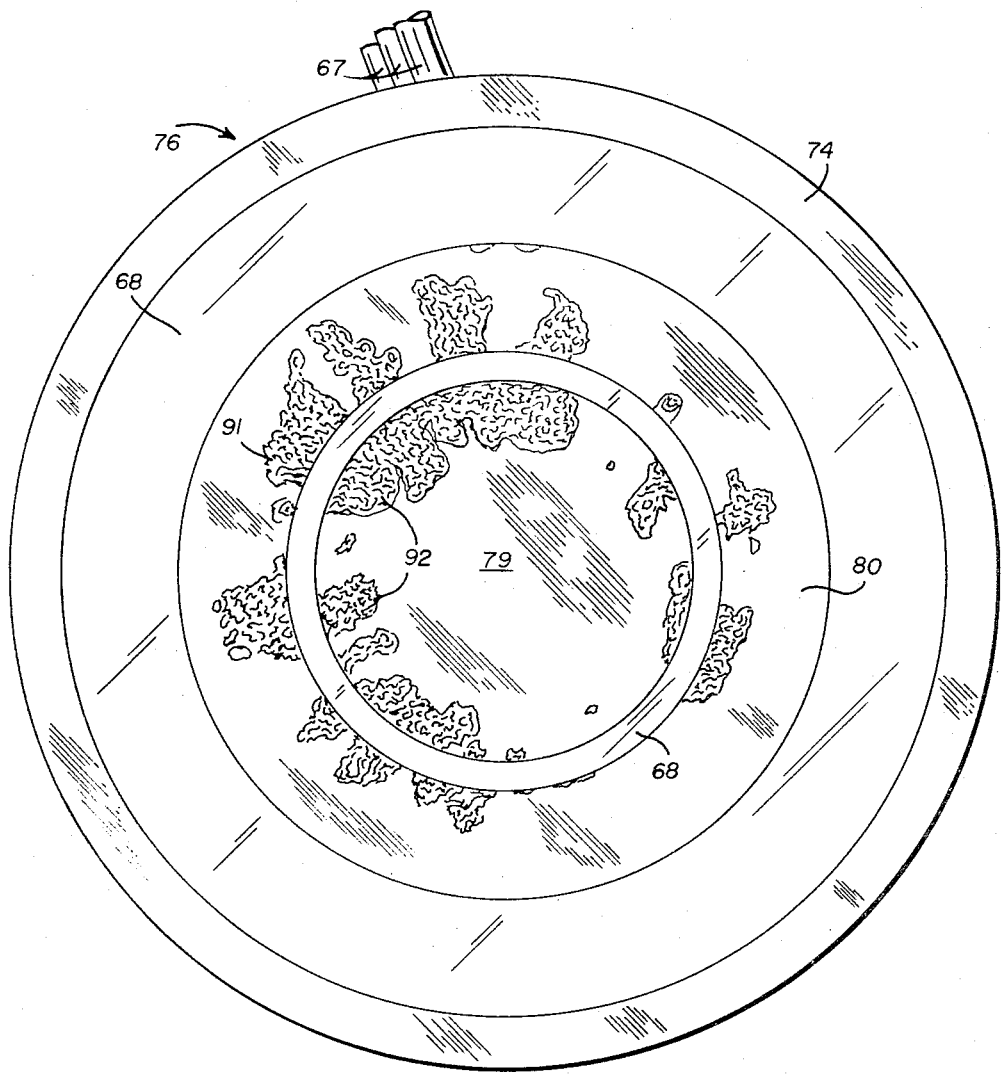
Figure 21:
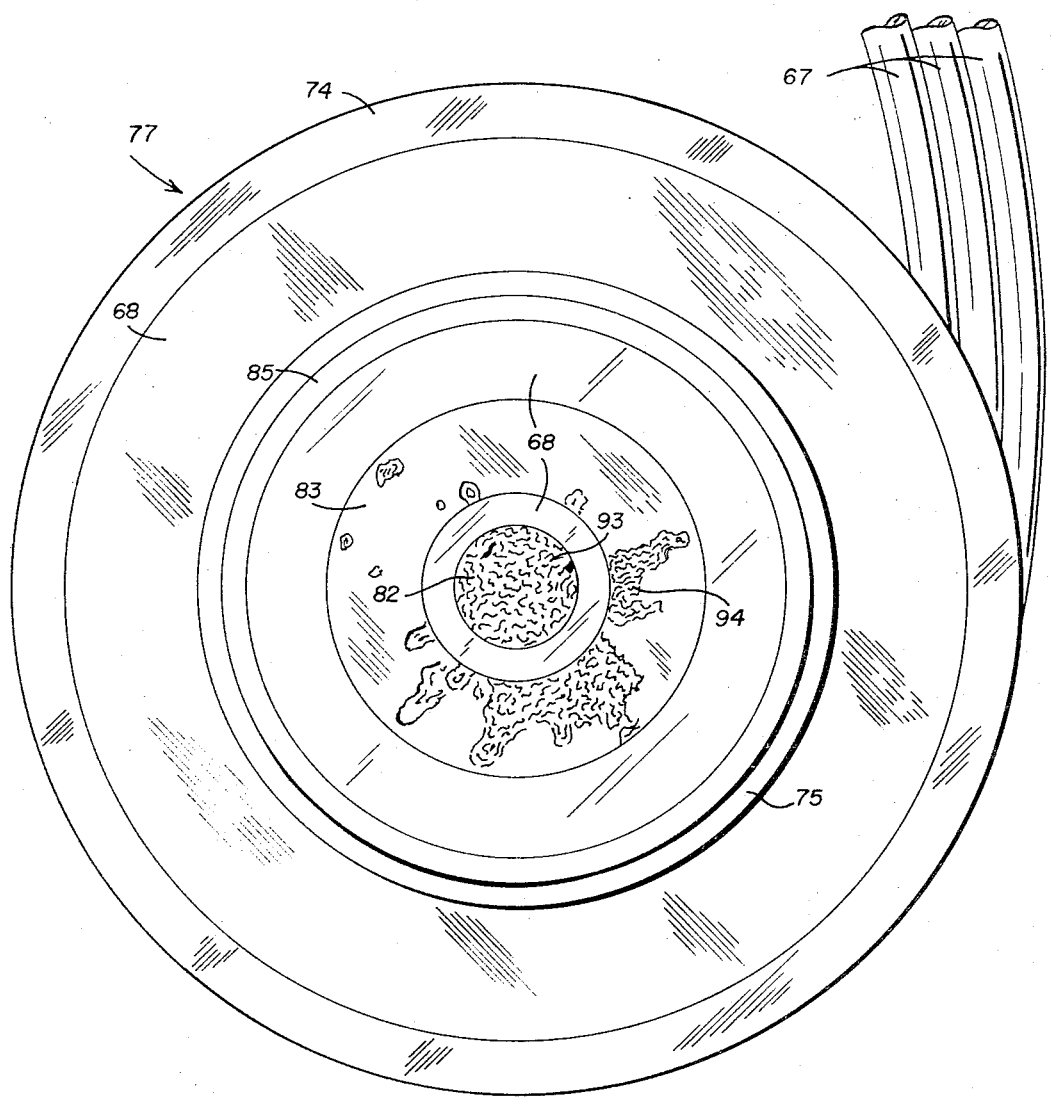
Figure 22:
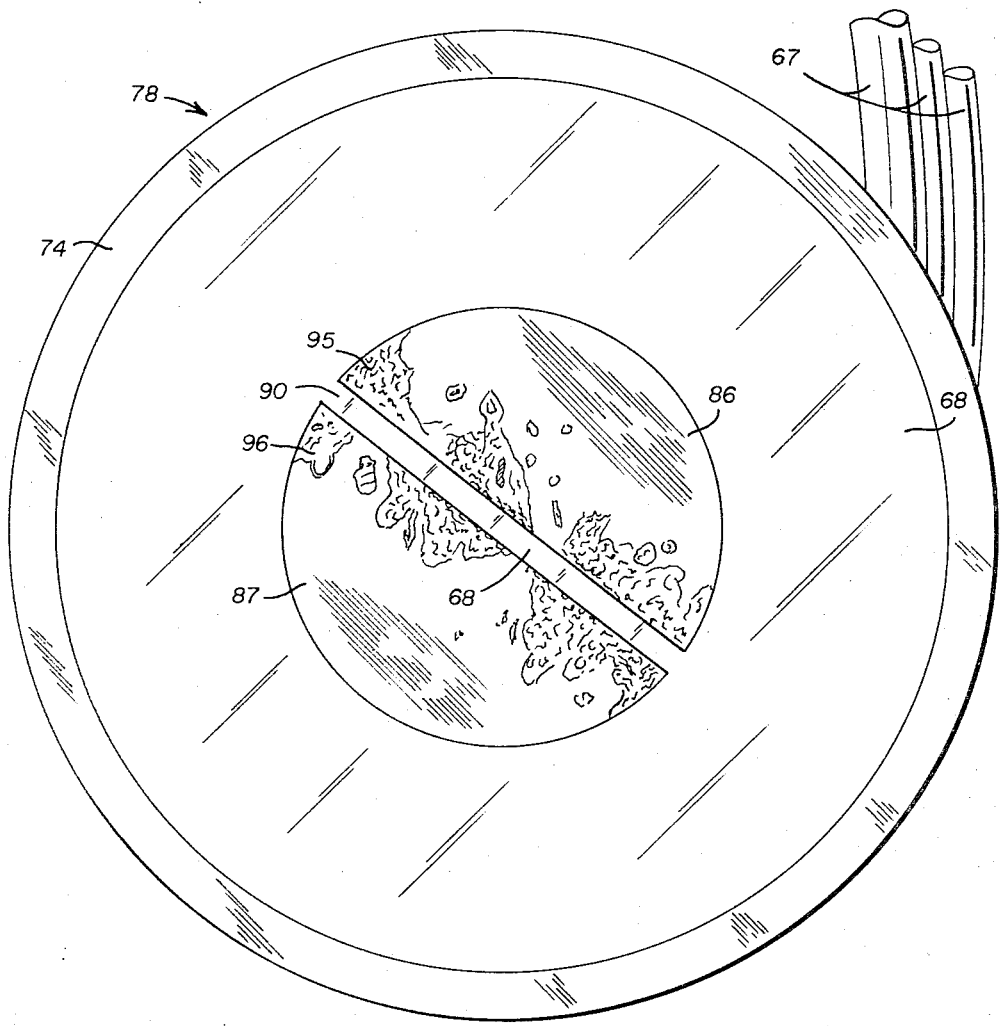
Figure 24:
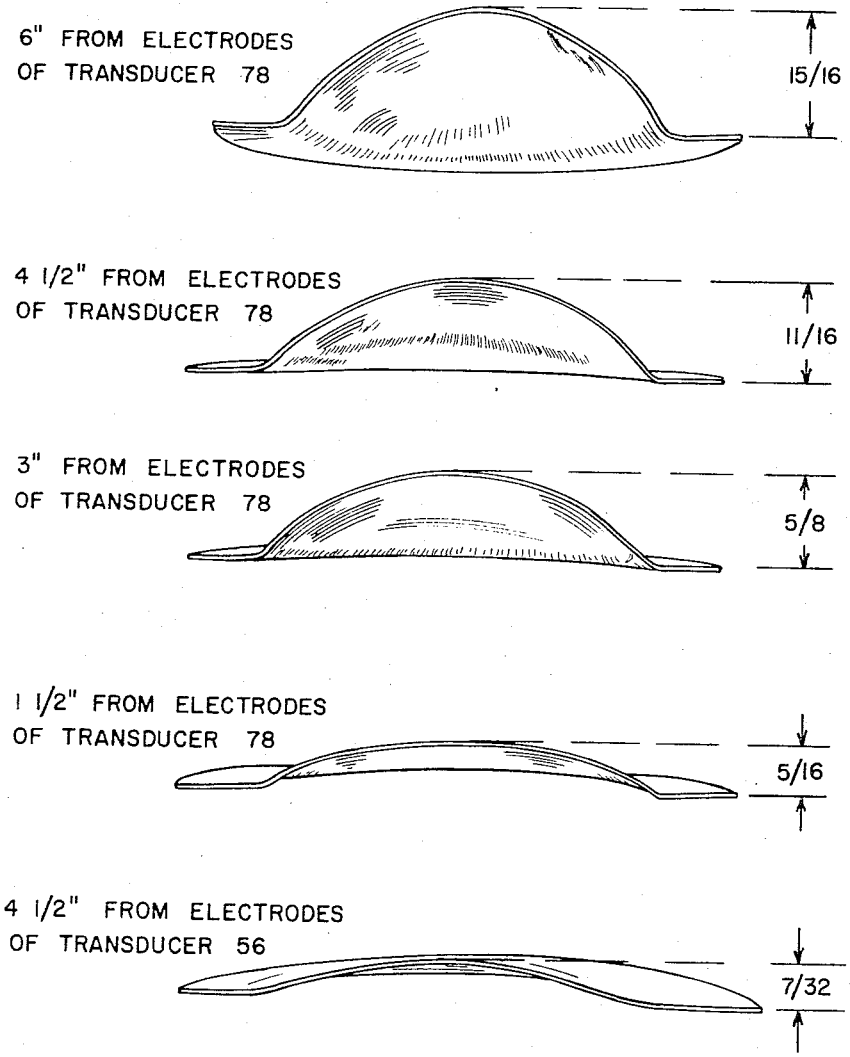
Figure 25:
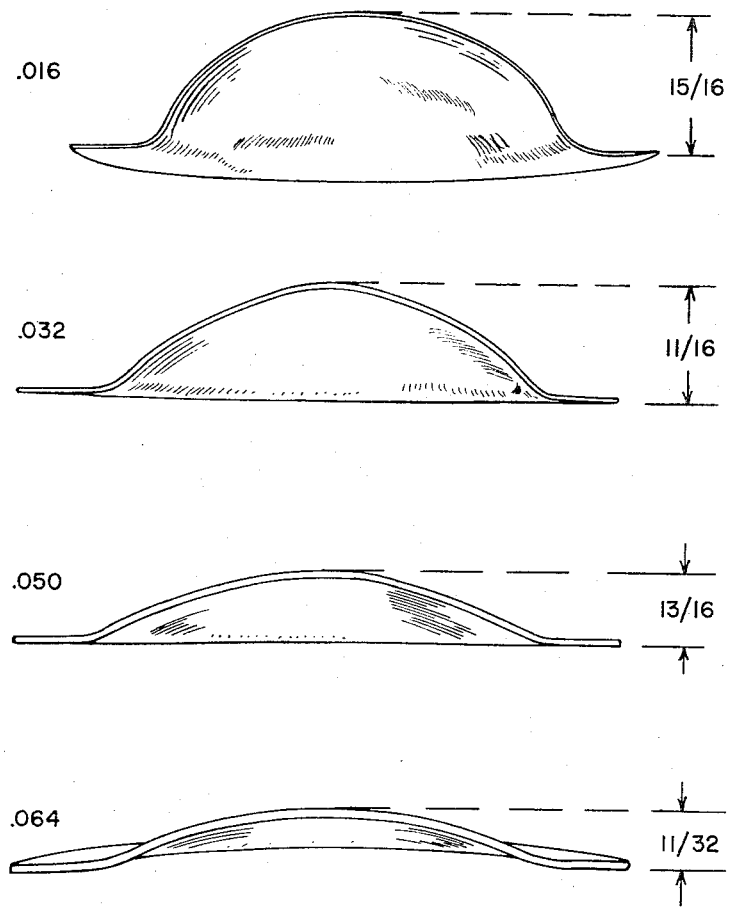
Figures 28, 29:
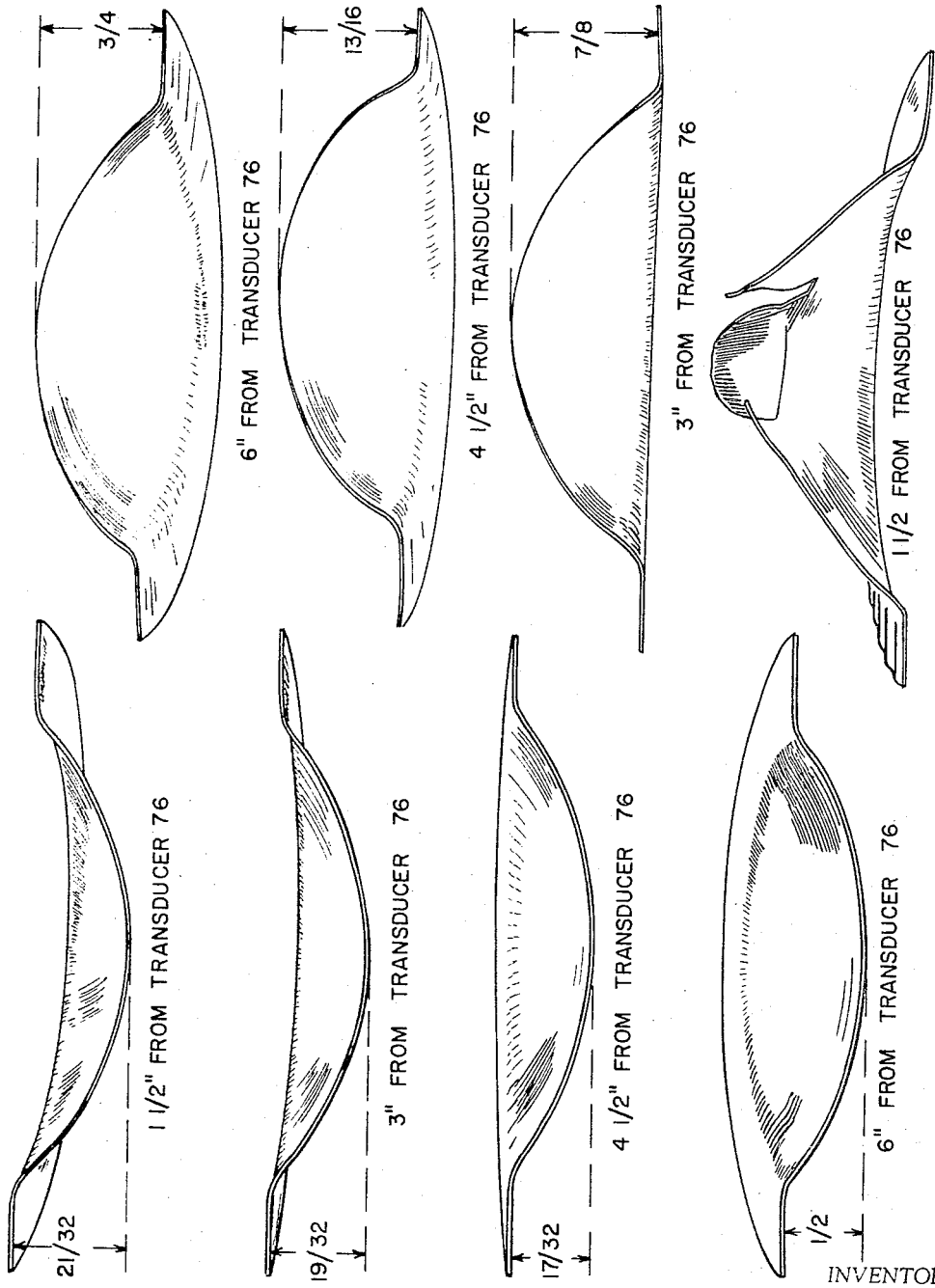
Figure 30:
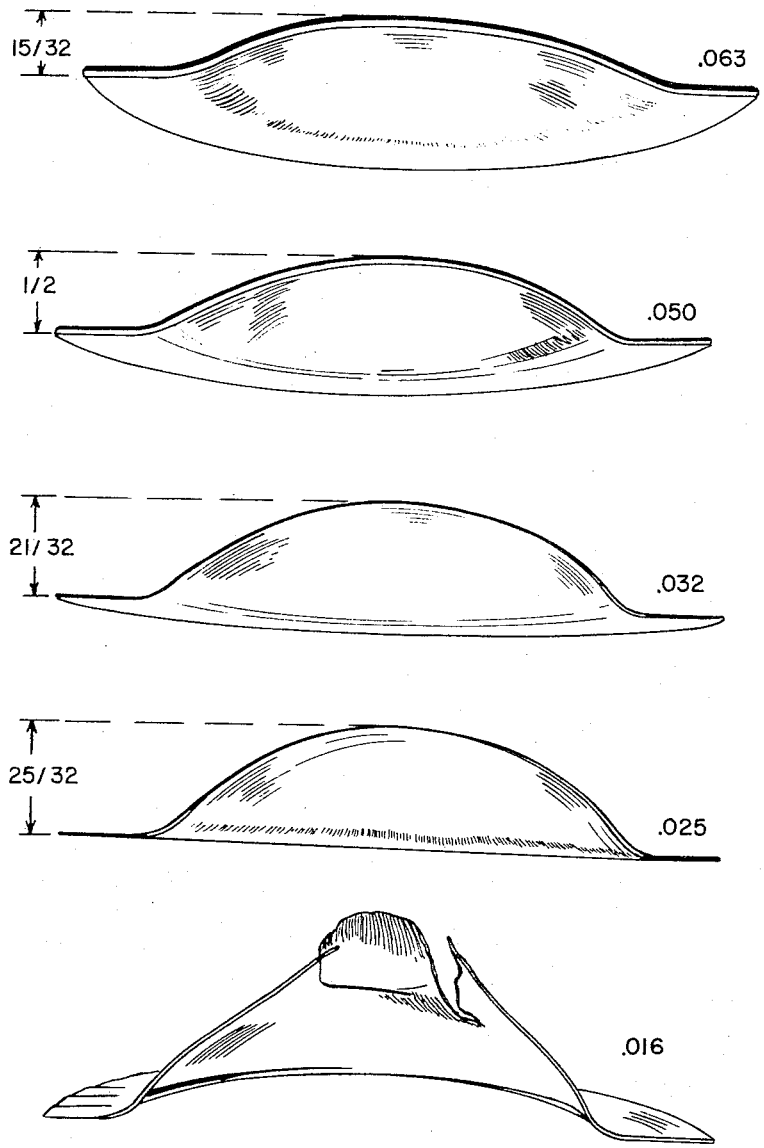
Figure 31:
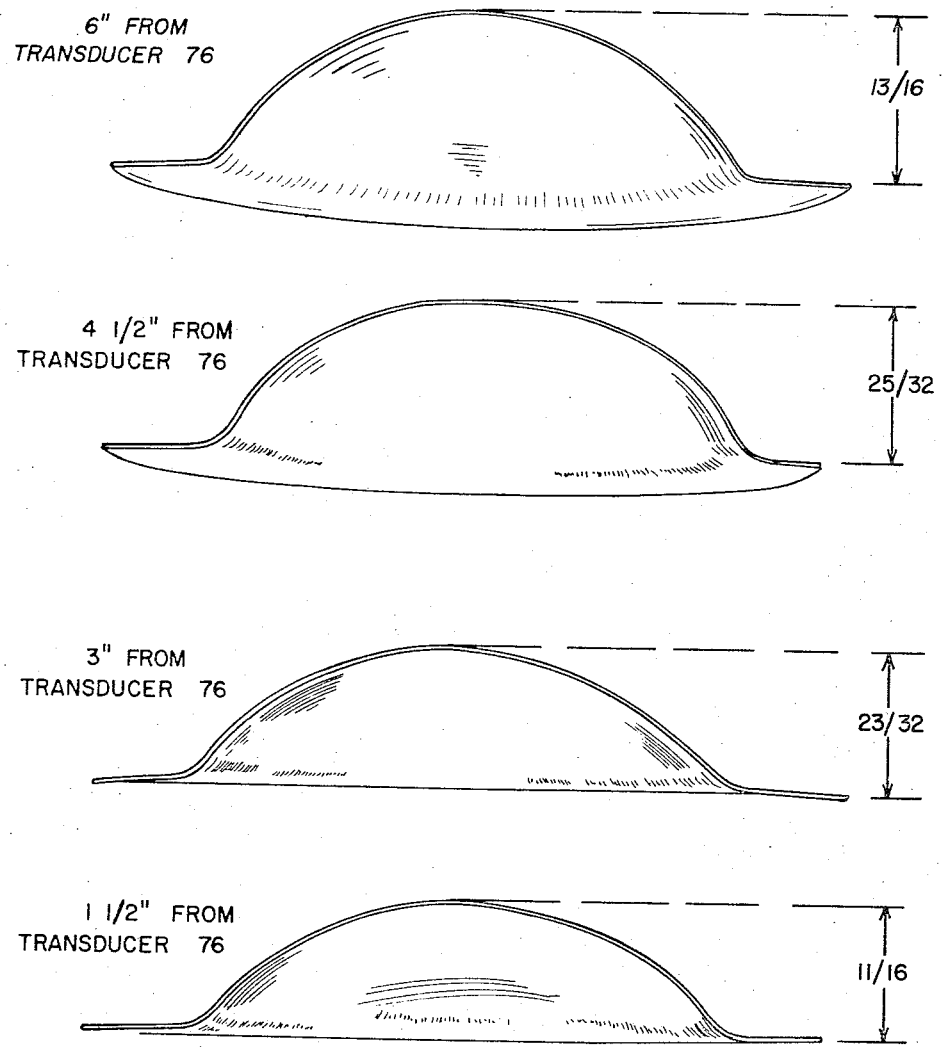
Figure 34:
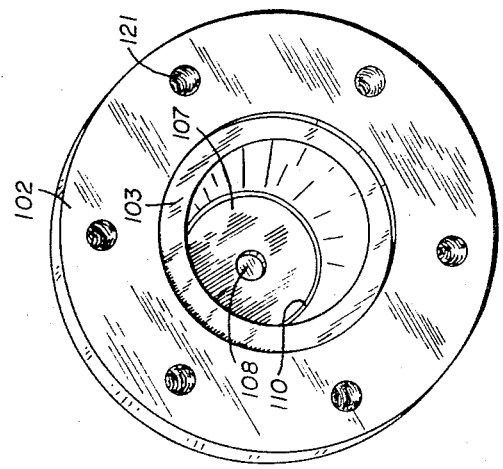
Figure 35:
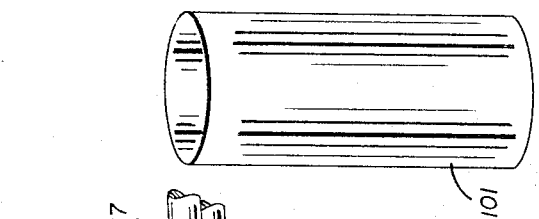
Figure 33:
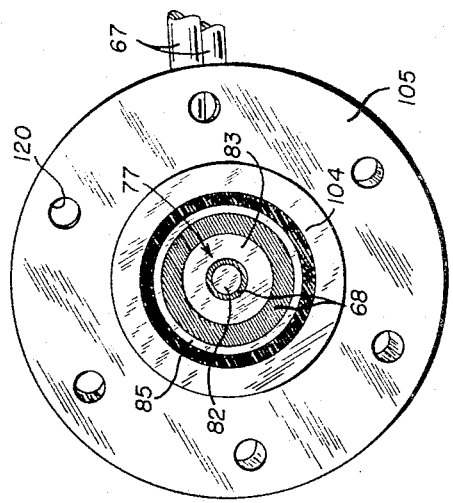
Figure 36:
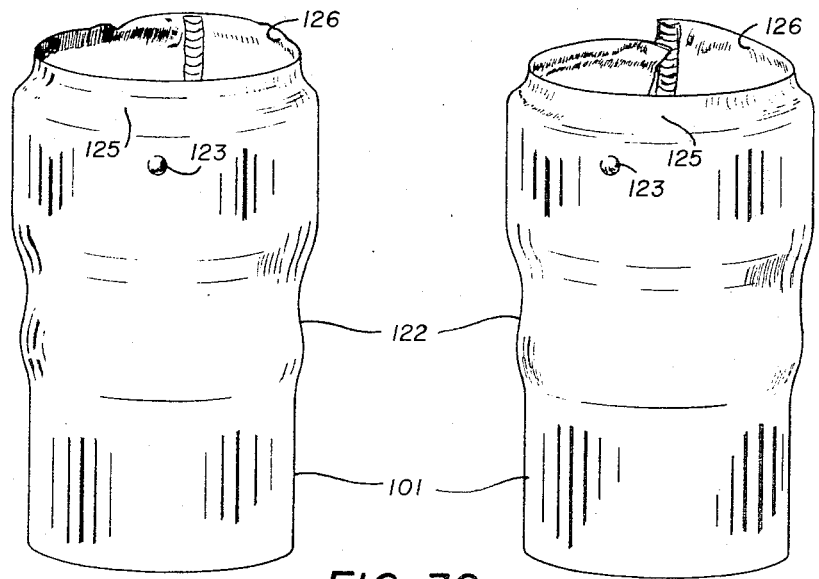
Figure 53:
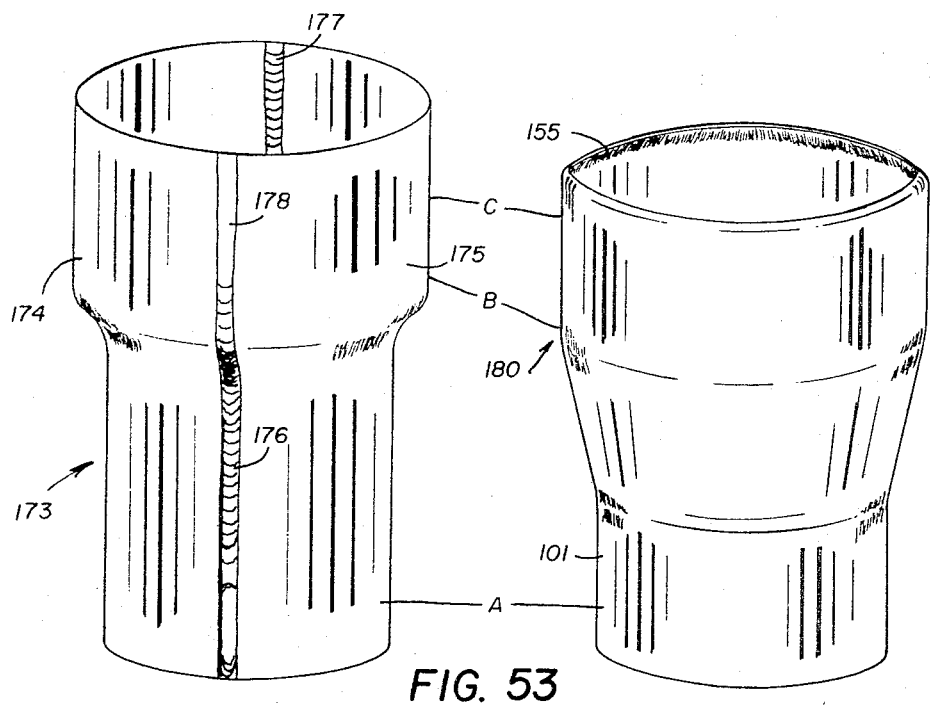
Figure 37:
Figures 43, 45:
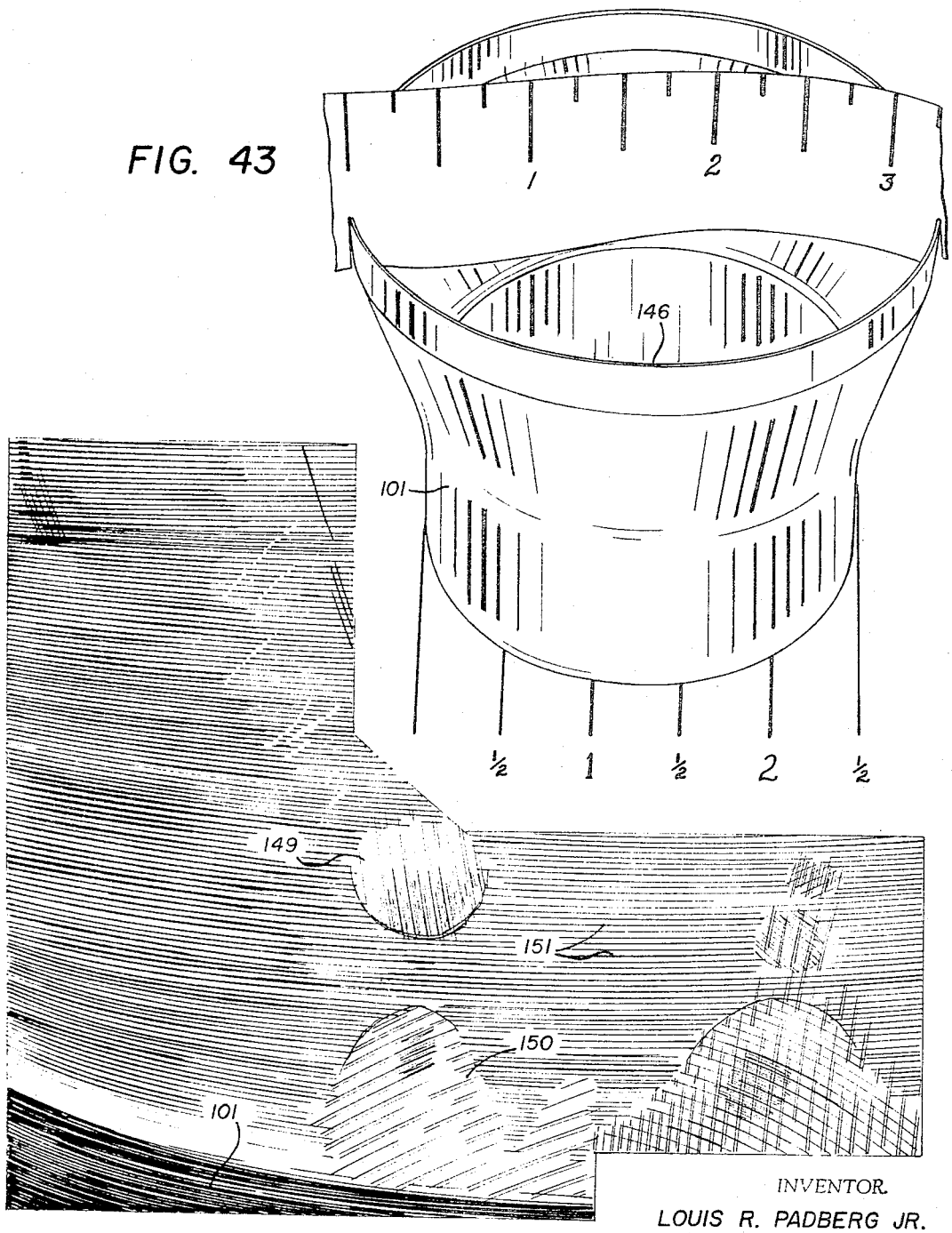
Figure 44:
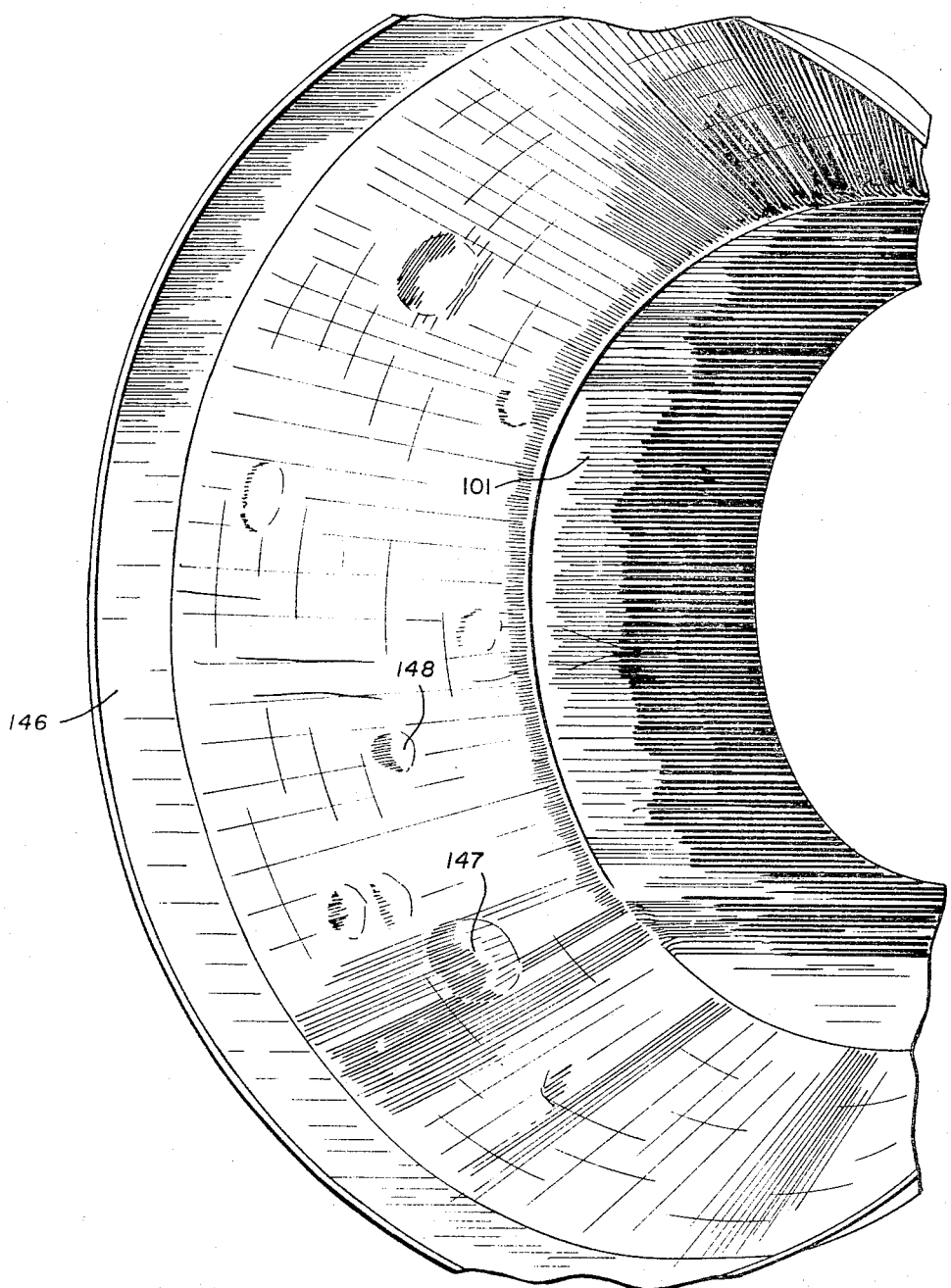
Figure 52:
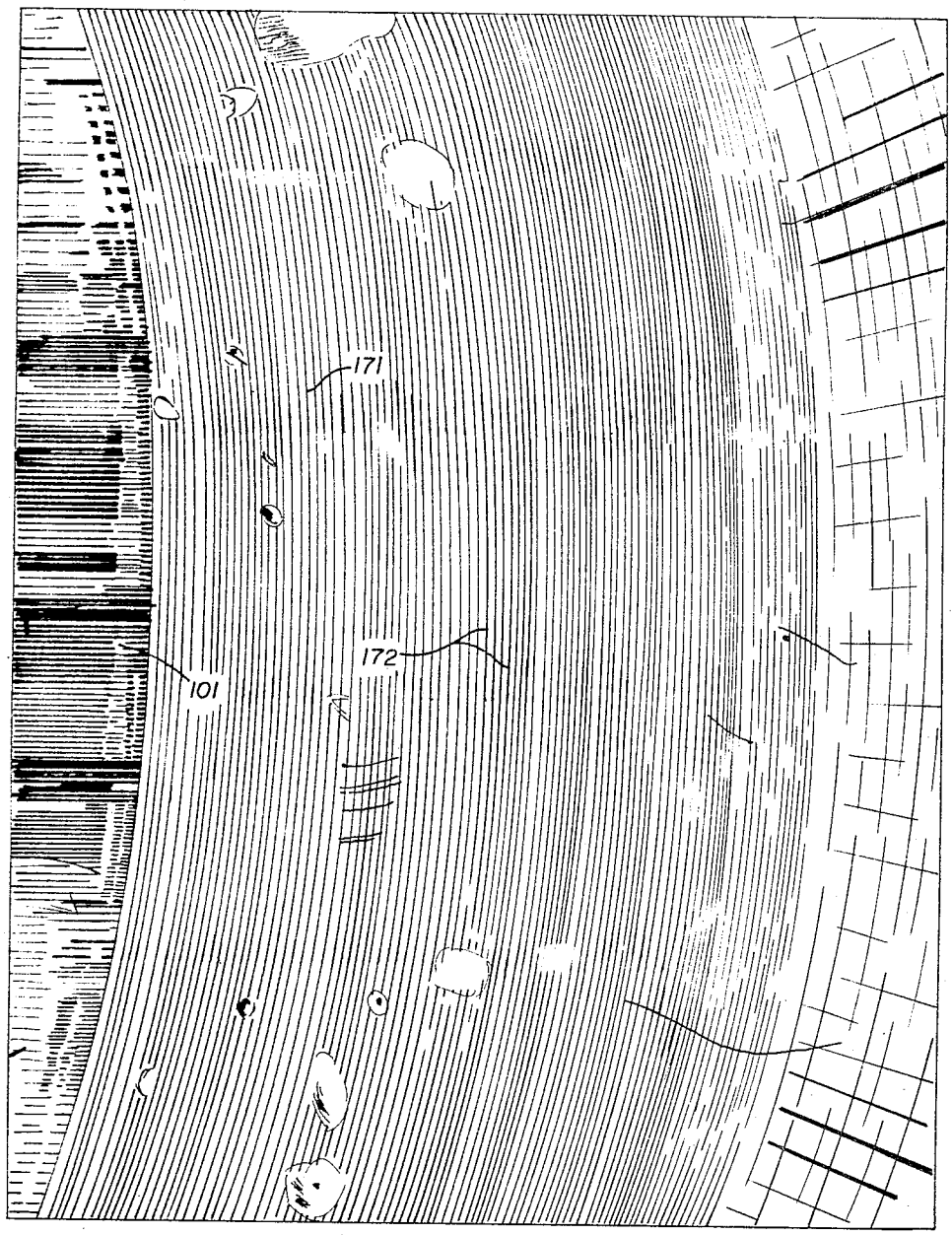

FIGS. 14 to 16 disclose three different forms of electrode assemblies suitable for use with the apparatus of FIGS. 12 and 13;

FIGS. 17 to 19 disclose the electrode details employed respectively in the electrode assemblies of FIGS. 14 to 16;

FIGS. 20 to 22 are views depicting the effects of electrical discharge on the electrode assemblies of FIGS. 14 to 16;

FIGS. 23 to 26 are views depicting the formation of several parts which have been formed by electrical discharge in the apparatus of FIGS. 10 and 11 and disclosing comparatively how the formation of the several parts varies with the gage of the sheet metal, the spacing of the parts from the transducer electrodes, and the type of transducer employed;

FIG. 27 is a view depicting the formation of a pair of stacked parts of the same gage;

FIGS. 28 to 30 are views similar to FIGS. 23 to 25 and respectively indicating comparatively therewith the change in formation of corresponding parts as a result of giving the water-exposed face of the electrode a six inch concave spherical radius;

FIG. 31 is a view similar to FIG. 29 and indicating the uniformity of forming of parts spaced different distances from a transducer whose water-exposed face has been given a twelve inch concave spherical radius;

FIGS. 31a to 31d are schematic views depicting variations in the forming of parts when spaced at different distances from the electrode face of the transducer for various types of curvature of the electrode face;

FIG. 32 is a sectional view of a die for expanding a portion of the length of a tube both diametrically and circumferentially to predetermined dimensions;

FIGS. 33 and 34 are perspective views of portions of the die as seen along the line 33—33 and 34—34 of FIG. 32;

FIG. 35 is a perspective view of a thin walled tube which is to be expanded in the die of FIGS. 32 to 34;

FIG. 36 discloses perspective views of parts which have been formed in the die of FIGS. 32 to 34;

FIG. 37 is a view magnified several times of a portion of the part shown in FIG. 36;

FIG. 38 is a view schematically depicting the adaptation of vacuum to the die of FIG. 32;

FIG. 39 is a view of the die of FIG. 38 modified to receive the electrode at either end of the die;

FIG. 40 is a view similar to that of FIG. 39 and illustrates a suitable arrangement for eliminating the reflected shock waves which are produced in the arrangement of FIG. 42;

FIGS. 41 and 42 are views of parts which have been formed in the die arrangements of FIGS. 39 and 40 respectively;

FIG. 43 is a view in perspective of an aluminum part which has been formed in the die arrangement of FIG. 39 with an electric discharge supplied from the capacitor arrangement of FIG. 3b;

FIG. 44 is an enlarged view looking into the expanded end of the part shown in FIG. 43;

FIG. 45 is a view illustrating a portion of the part of FIG. 43 taken externally thereof at six times magnification;

FIG. 46 is a sectional view, somewhat enlarged, illustrating a modification of the upper portion of the die of FIG. 39;

FIG. 47 is a plan view of another modified form of the upper portion of the die of FIG. 39;

FIG. 48 is a view in section of a modified die arrangement which employs the upper die portion of FIG. 47;

FIG. 49 is a view in perspective of a copper part which has been formed in the die arrangement of FIG. 39 with an electric discharge supplied from the capacitor arrangement of FIG. 3c;

FIG. 50 is a perspective view of an aluminum part which has been formed in the die configuration of FIG. 39 modified by the use of the die part disclosed in FIG. 46 and with an electric discharge supplied from the capacitor circuit arrangement of FIG. 3c;

FIG. 51 is a view in perspective of a stainless steel part which has been formed in the die configuration of FIG. 48 with an electric discharge supplied from the capacitor circuit arrangement of FIG. 3d;

FIG. 52 is a view, somewhat enlarged, illustrating a portion of the part of FIG. 51 taken externally thereof;

FIG. 53 is a perspective view illustrating the part of FIG. 51 comparatively with that of a comparable part which has been formed by prior art methods; and FIG. 54 is a sectional view of a further alternative die configuration for practicing the metal forming process of the present invention.

When an electric field exists between two electrodes in a gaseous atmosphere, the free electrons in the field accelerate toward the anode. If the field strength exceeds a certain critical value, this electron movement initiates several phenomena which involve the formation of electron avalanches and ion clouds and the production of photons (energy in the form of light) in a complex process which ultimately results in a completely ionized low-resistant path through which the discharge occurs. The discharge in water is more complex.

When extremely high potentials are applied across an electrode gap immersed in an electrically conducting fluid, the ensuing electrical discharge thereacross causes sudden and rather large increases in temperature—of the order of thousands of degrees Fahrenheit—in said fluid between the electrodes. As a result, if that fluid is electrically conductive water such, for example, as sea water or ordinary tap water, it becomes vaporized and a gaseous bubble is formed. This bubble then expands and collapses, whereupon another bubble forms and collapses, with this process of bubble forming, expanding and collapsing alternately occurring as long as the electrical potential is applied to the electrodes at a critical level. The alternate bubble expansion and collapse causes a radiation and propagation of acoustic waves comprising sharp pressure pulses.

The frequency of this acoustic or sonic energy wave radiation is dependent upon a number of factors, most of which may be varied within the design limits of this invention without departing from the scope or spirit thereof. For instance, such variable factors could include spacing of the electrodes, size of the electrodes, materials of the electrodes, amount of electrical energy employed, and the submersion depth of the subject sound source in the aqueous or other fluid medium within which it is operating. However, for most practical purposes, the maximum spectral energy occurs at a frequency which is approximately the reciprocal of the bubble pulse interval.

The phenomena associated with the bubble formation, expansion and contraction is ostensively of considerable complexity; however, experimental operation of the subject invention within sea water seems to indicate that the high intensity electrical spark discharge actually breaks down the water into its gaseous elemental components, to wit, hydrogen and oxygen since a collection of such gaseous components explode when ignited in air. Of course, the expansion and collapse of the electric arc formed bubbles may readily be observed through operation of the device of the present invention in accordance with the principles thereof.

Figure 1:
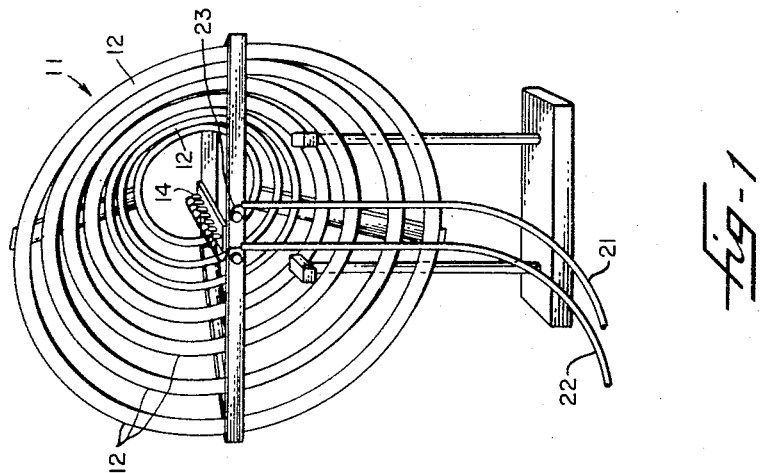
FIG. 1 is a view in perspective illustrating a device suitable for use in generating a unidirectional train of shock waves in water.
Figure 2:
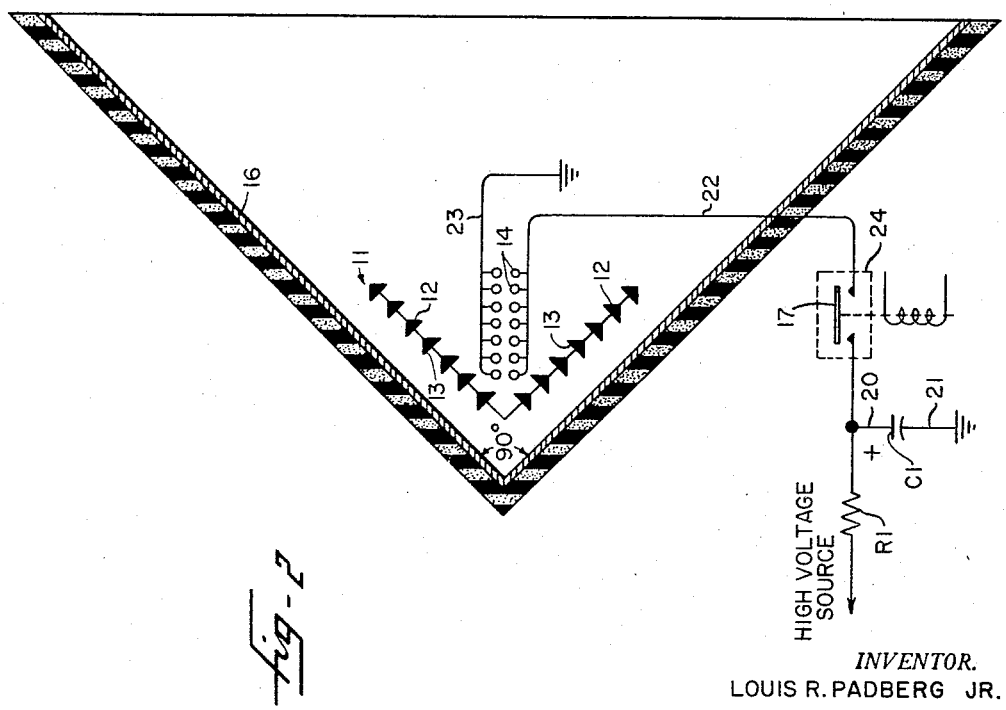
FIG. 2 is a schematic view of the device of FIG. 1 and further disclosing the same in relation to its discharge circuit and cone reflector.

Referring now to the drawings wherein like characters of reference designate like parts throughout the several views, and first more particularly to FIGS. 1 and 2 thereof, the cone ring assembly 11 comprises a plurality of axially spaced concentric rings 12 of triangular cross-section. As shown the hypotenuse of the right triangle faces the apex of the conical configuration. This surface 13 reflects noise bursts from a line of spark gaps 14 mounted along the axis of the ring assembly, rearwardly to the inner surface of a large cone reflector 16 backed by unicellular rubber. Instead of a single shock wave being emitted, the ring assembly 11 causes a train of shock waves to be reflected to the apex of the cone. The ring assembly is so positioned that the resulting reflections are made to fall in phase with the original shock wave. The end result is a uni-directional train of shock waves of a desired frequency determined by the number and spacing of the rings 12 and the duration of the wave controlled by a vacuum switch 17.

Spark plugs with non-corrosive plated multiple discharge points have been found to be suitable for forming the spark gaps 14. There are several ways of mounting and discharging them. A single gap may be mounted near the apex of the cone ring and the explosive energy confined to a point source. The gaps of several spark plugs or similar devices can be connected in series or parallel arrangements and fired singly or in unison by means of suitable commutating devices. In the use of spark plugs, the tops must be well insulated so that only the points are shorted in the water or much of the energy will be lost.

The shape and size of the electrodes has a considerable bearing upon the operation of the spark gap. Since the energy dissipated during the breakdown is directly proportional to the capacitance discharged $$\left(E=\frac{CV^2}{2}\right)$$

it should be desirable to have as high a capacitance as possible. But the higher the capacitance the lower the source impedance must be to charge it to the breakdown voltage in its specific time interval ($T$=resistance$\times$capacitance). If it is desired to interrupt the discharge at very fast rates, then the capacitance must be small or the condenser will not take on its full charge. This rate of discharge causes one to select a large or small condenser, for the particular job at hand. For example, in very shallow seismic work, a small capacitor would be used. For deep work, one would use very large capacitors. Since it takes the sound longer to travel the distance, such rapid discharge rates are not necessary.

While it has been found in the use of this form of the invention that a 6 kv. source and a ½ to 120 microfarad capacitor have been satisfactory, it should be understood that these are not to be considered as limitations and that other values may be preferred under certain conditions.

From the foregoing, it is thus apparent that there has been provided a method of generating within a body of electrically conductive water a series of shock waves comparable in intensity and wave front to those generated by explosives. This method comprises the primary step of discharging electrical energy through a predetermined short circuited path within the water at a level of intensity and rate of discharge sufficient to form a rapidly expanding and collapsing gas bubble with accompanying shock waves comparable to those obtainable from explosives. The method also involves secondary steps depending upon the results desired. For example, the method may comprise the additional step of reflecting the shock waves and directing the same along a predetermined path within the water when directional effects are desired. As aforedescribed, the process may also comprise the further steps of controlling the frequency of propagation of shock waves along the predetermined path within the water and establishing an in-phase relation of the shock waves so propagated along the path.

From the foregoing, it will also be apparent that in the practice of the aforedescribed method, there is involved a body of electrically conductive water within which predetermined portions of a pair of spaced electrodes are immersed and electrically shorted by the water and wherein means are provided for insulating the electrodes, except for the predetermined portions, from each other and from the water. Means are also provided for storing electrical energy at high level and discharging the same across the gap between the immersed and exposed electrode portions shorted by the water, this means being of such nature as to discharge the energy at a high level of intensity and rate of discharge sufficient to form a gas bubble which rapidly expands and collapses within the water with accompanying shock waves therein comparable to those obtained from explosives.

This means for discharging electrical energy at the required level of intensity and rate of discharge includes the storage capacitor C1, which for this purpose, preferably has a capacitance of the order of 120 microfarads and is adapted to withstand a high direct current charging voltage of the order of upwards of a thousand volts to which it is charged from a high voltage source by way of resistor R1. The capacitors as hereinafter disclosed are substantially identical with capacitor C1 and, except as otherwise specified, may be considered to be conventional welding capacitors having a working rating of 3000 volts and a capacitance of 120 microfarads.

The intensity of the shock wave is determined by the level and rate of the electrical energy discharged and this, in turn, is determined by the voltage and capacitance employed and by the impedance which opposes the flow of current in the discharge circuit. The energy available for discharge may be optimized in accordance with the equation $$E=\frac{CV^2}{2}$$

as specific circumstances permit. Extreme increases in voltage, however, may be difficult and dangerous to handle and leakage losses of energy may offset energy storage gains. Extreme increases in capacitance will adversely affect the rate of discharge since the time constant varies directly as the product of total resistance and capacitance of the discharge circuit ($T=RC$). The greatest shock wave, of course, results when the stored energy is dumped or discharged quickly, this being the case when the flow of current is substantially unobstructed.

The inductance of the capacitor is also a factor which obstructs the flow of the discharge current and thus limits the intensity of the shock wave resulting from the discharge for a given capacitance rating and charging voltage. It is essential, therefore, that the internal inductance of the capacitor be of a low order since it will oppose the sudden release of energy therefrom. Optimum capacitors for the purpose are those constructed for the Atomic Energy Commission of which a typical type is the XN–273–3A manufactured by the Tobe Deutsch Mann Corp. and having a rating of 30 mfd., a D.C. working voltage of 14.4 kv., and an inductance of .05 microhenry.

The leads 20 and 21 of the capacitor must also have low inductance as well as resistance and to this end are formed of heavy copper buss or welding cable in order to handle discharge currents which, as measured, may be upwards of the order of 200,000 amperes during discharge. Capacitor lead 20 connects to the vacuum relay 17, and the conductor 22, which interconnects the vacuum relay with the spark gaps 14, must likewise be formed of heavy copper buss, or welding cable. As may thus be seen in FIG. 2, conductor 22 interconnects the electrodes on one side of the gaps 14, and the opposing electrodes are interconnected as by grounding of the same as indicated at 23, it being noted in FIG. 1 that capacitor lead 21 is also grounded as at 23 to the supporting framework for the gaps 14 and the reflecting rings 12.

The energy stored in capacitor C1 is transferred by way of vacuum switch 17 to gaps 14 and, for this purpose, switch 17 must be a low impedance, high voltage, high current type of switch such as Jennings RH4G, in which the switch is enclosed in a vacuum as indicated at 24 and operated by the externally disposed solenoid 25. By reason of this arrangement, the noise of the spark is eliminated and contact resistance and sparking of the switch are reduced to a minimum.

The electrode points of gaps 14 are virtually shorted by the conductive water paths therebetween, and for these gaps to make efficient use of the electrical energy discharged thereacross, the gaps must present a high resistance to the discharged energy in accordance with Ohm's law ($P=I^2R$). In order to provide a high resistance, the electrode points must be widely spaced and, as aforedescribed, the points only must be shorted by the water in order to avoid energy loss therein.

The resistance of the gap is thus maximized and the remaining resistance and inductance in the discharge circuit are minimized to provide maximum dissipation of energy at the gap in the shortest possible interval of time, the resistance of the gap being the principal impedance in the discharge circuit and the time of discharge being determined by the time constant product RC, as aforenoted, and the time constant factor $L/R$ in an RLC discharge circuit comprising resistance, inductance and capacitance.

When operating at or near resonance, the resistance only in the discharge circuit will substantially impede the flow of current therein since the capacitive and inductive reactances substantially cancel under such conditions. Manufacturers of high energy capacitors, however, are careful to specify the inherent inductance of the capacitors as well as their resonating or ringing frequencies, and generally caution against inductance in the leads, etc. in view of the high reactance and inverse voltages which occur across the reactive components at resonance. Nevertheless, resonance may be employed to advantage where large capacitance values are used since the capacitive reactance $Xc$ decreases with increases in C in accordance with the expression:

$$Xc = \frac{1}{2\pi fc}$$

where $f$ is the frequency.

At or near resonance, the capacitive reactance will substantially equal the inductive reactance $Xl$ which is expressed as:

$$Xl = 2\pi f$$

Since this is low where C is large, notwithstanding the fact that the resonant frequency is desirably high for shock wave generation, voltages $IXl$ and $IXc$ will be relatively low notwithstanding the high values of discharge current I at or near resonance. Such additional small inductance as required to match $IXl$ to $IXc$ may be provided, for example, as by coiling the capacitor leads.

It is to be noted that the body of water surrounding the gaps 14 is at least partially enclosed by the rings 12 of the cone ring assembly 11 and by the cone reflector 16. The cone assemblies 11 and 16 thus, separately or collectively, provide a pressure chamber which is at least partially closed and within which shock waves resulting from the discharge of the electrical energy within the enclosed body of water are reflected, focused and directed through the medium of the surrounding water, all in a predetermined manner, as aforedescribed. Moreover, it will be noted that the capacitor storage source of the electrical energy to be discharged across the gaps 14 is located outside this enclosed body of water, and great care is exercised, as aforenoted, to insulate the path of energy to the water-exposed electrode points against energy losses both outside and inside the body of water.

Referring now to FIG. 3 for a more detailed description of the charge and discharge control circuits for capacitor C1, it will be seen that the apparatus or gear comprising the charge and discharge circuits respectively are separated, as indicated by the dashed line 26, into two racks, rack 1 and rack 2. Each rack comprises a high speed relay switch S1 and an associated impulse control switch S2. This charge and discharge circuit apparatus or gear comprises the High Voltage Source designated in FIG. 2, switch S1 of rack 2, namely, its contact 1 and switch arm W, being inserted between resistor R1 and capacitor C1 in FIG. 2. The solenoid winding for vacuum switch 17, shown unconnected in FIG. 2, is connected in the manner disclosed for solenoid winding 25 of FIG. 3.

Each switch S1 comprises a main switch arm W which is driven selectively between the two positions designated 1 and 2 at high speed by a motor which operates at high speed of the order of 7000 r.p.m. The motor is illustrated schematically as having an armature 27 and independently energizable windings 1 and 2, the arrangement being such that momentary closure of the OFF button of switch S2 of rack 1 energizes winding 2 to drive switch arm W to position 1 which is the position comparable to that shown for switch S1 in rack 2. Following this operation, momentary depression of the ON button of switch S2 of rack 1, will energize winding 1 of S1 to return switch arm W to position 2 as shown in rack 1. In the arrangement of rack 2, the wiring between switches S1 and S2 is reversed such that actuation of the ON button of impulse switch S2 moves switch arm W into position 1 of switch S1, as shown, and momentary actuation of the OFF button of this impulse switch moves switch arm W of switch S1 into position 2 of the switch.

Switch arm W of each switch S1 is disclosed schematically as having a cam 28 which, upon actuation of the arm from position 1 to position 2 of the switch, is moved to actuate an internal switch 29 to closed position as illustrated, for example, by the position shown for switch S1 of rack 1. Switch S1 may be of any type suitable for the purpose, but preferably is of the type manufactured by the Schweitzer & Conrad Co. Inc. of Chicago, Ill. Catalog No. QA-35972-A, Ser. No. 7531.

Rack 1 further comprises a high voltage direct current power supply which, as disclosed, is in the form of a conventional full wave rectifier comprising high voltage rectifier tubes G1 and G2 which may be of any type suitable for the purpose such, for example, as Western Electric type W.E. 705A. Associated with tubes G1 and G2 in a conventional manner are plate transformer T1 and filament transformers T2 and T3. Alternating current for energization of the transformers is supplied at input terminals 30 and may be a conventional 110 volt, 60-cycle source. Fuses 31 preferably are employed in the power lines leading from terminals 30, and fuses 32, in addition, preferably are employed between the plates of tubes G1 and G2 and the secondary winding of plate transformer T1. A dual variac, comprising sections V1 and V2 which are ganged together as indicated at 33 and wired together in parallel, is employed to provide a variable high voltage source of alternating current for operation of plate transformer T1.

In the operation of the circuit of FIG. 3, filament switch S3 is first closed to apply power line potential via conductors 37 and 38 to filament transformers T2 and T3, as will be indicated by the lighting of filament lamp L2. It will be understood that in the standby or non-use condition of the equipment, both wiper arms W of high speed relays S1 of racks 1 and 2 will be in position 1 of the switches. This assures that any charge remaining on the storage capacitor will be discharged to ground by way of conductor 34, switch arm W in position 1 of high speed relay switch S1 of rack 2, resistor R1, conductor 35, switch arm W in position 1 of high speed relay switch S1 of rack 1, conductor 36, and thence by way of resistor R2 to ground, it being noted that the other side of the storage capacitor is grounded. As a safety precaution, preparatory to setting the gear into operation following a period of non-use, the OFF button of impulse switch S2 of rack 1 is depressed, following closing of filament switch S3, to thus connect winding 2 across conductors 37 and 38 and move switch S1 of rack 1 into its position 1, in the event that it is not already in such position, so that the energy banks will be drained off, as aforedescribed.

Plate switch S4 is now closed. Plate voltage, however, is not yet applied to plate transformer T1 because of a second precautionary feature which is provided by high speed relay S1 of rack 1. Thus, it is not until the ON button of impulse switch S2 of rack 1 is closed to move wiper arm W of switch S1 into position 2 of the switch to close internal switch 29, as shown, that a circuit is completed by way of switches S3, 29 and S4 to the parallel connected variac sections V1 and V2, this circuit being traced from power on filament line 37 to switch 29, switch S4, conductor 39 to variac sections V1 and V2, and thence by way of line 38 to the other terminal 30 of the input source. It will be noted that lamp L1, like variac sections V1 and V2, is connected across conductors 38 and 39 and, accordingly, lighting of this lamp indicates that the variac has become energized. The delay thus afforded in the foregoing sequence of switch closures assures that the filaments of tubes G1 and G2 will have been turned on for a few seconds warm up period prior to application of plate potential to the tubes.

It is now possible, by way of adjustment of ganged wipers 40 of variac sections V1 and V2 to apply voltage of desired level to transformer T1 by way of conductor 41, the other side of the primary winding of transformer T1 being connected to conductor 38. The full wave rectifier is now in operation and a direct current charging current is supplied to condenser C1 by way of the connected filaments of tubes G1 and G2, conductor 43, switch arm W in position 2 of high speed relay S1 of rack 1, conductor 35, resistor R1, switch arm W in position 1 of high speed relay S1 of rack 2, and thence by way of conductor 34 to condenser C1, the other side of which is grounded, as is the center tap of the secondary winding of transformer T1, to thus complete the charging circuit. The dual variac is adjusted until the level of the charging voltage, as indicated by the voltmeter 44, has been raised to a desired value. Voltmeter 44 conveniently is interconnected in series with a protective resistor R3 between conductor 43 and ground.

An energy storage bank comprising capacitor C1, or a bank of capacitors, as the case may be, preferably is charged through the current limiting resistor R1 in order to slow up the charge and lengthen the life of the capacitors. The time of the charge, of course, will be in accordance with the time constant product R1C1 and will be of the order of less than a second. The charging time, however, may be increased considerably where, as in the case of metal forming applications, the time required for charging the storage capacitor is not a critical factor.

It will be noted that when the gear is in its capacitor on-charge-condition, high speed relay S1 of rack 2 is in its position 1 setting of wiper arm W of the switch and that this is the position which switch S1 assumes, or has assumed, on the depression of the ON button of impulse switch S1 of rack 2.

Preparatory to discharging the energy from the storage bank into the gap 14, the charging circuit to the storage capacitors is first interrupted, this being a first safety feature which is provided by the high speed relay S1 of rack 2. Since a heavy back surge of current results when the capacitor bank is effectively short circuited by the gap 14, relay switch S1 of rack 2 thus serves to protect the high voltage supply of rack 1 from this back surge of current by breaking the charging circuit as wiper arm W of the switch is moved from position 1 to position 2 of the switch. It is also to be noted that internal switch 29 of the high speed relay switch S1 of rack 2 is connected in series with a discharge button switch S5, switch S5 being connected to power line 38 and switch 29 being connected by conductor 45 to solenoid 25 of vacuum switch 17. The other side of solenoid 25 is connected to filament power line 37, and switch 29 thus insures that switch button S5 cannot be actuated to discharge the energy bank unless switch 29 has been closed by the proper sequence of movement of wiper arm W from positions 1 to 2 of the high speed relay switch S1, this being a second safety feature provided by this high speed relay.

Thus, to initiate the discharge cycle, the OFF button of impulse switch S2 of rack 2 is closed momentarily to move switch arm W of high speed relay S1 of rack 2 into its position 2 setting whereupon the charging circuit is interrupted and the discharge control circuit is readied as by closing of switch 29. The readiness of the circuit for discharge is indicated by the lighting of lamp L3 when switch button S5 is depressed, lamp L3 being connected between conductor 45 and power line conductor 38. Solenoid 25, of course, is actuated upon closing of switch S5 and the vacuum relay switch 17 is thus closed to transfer the energy from the capacitor bank to the gap 14.

Following each discharge, the high speed relays S1 of racks 1 and 2 are returned to their position 1 settings in the order named and the gear again becomes completely turned off except for the energization of the filament transformers. The gear is then ready for another cycle of operations which are repeated as aforedescribed.

In a specific circuit arrangement which produced satisfactory results, the following circuit components and values were employed:

| Component | Reference | Rating |
|---|---|---|
| Dual Variac | V1 and V2 | 4 kv.-a. |
| Voltmeter | 44 | 0-20 kv. |
| High Voltage Relay Switch | S1 | 15 kv. |
| Capacitor | C1 | 4 kv., 100 mfd. |
| Resistor | R1 | 2,500 ohms, 400 watts. |
| Do | R2 | 500 ohms, 200 watts. |
| Do | R3 | 20 megohms. |

Various energy storage bank arrangements are possible for operation within the scope of the energy equation $$E = \frac{CV^2}{2}$$

such arrangements including various series, parallel, or series-parallel combinations of capacitors of various working voltage ratings as depicted schematically by way of example in FIGS. 3a to 3e. The power capacities in watt-seconds of these capacitor arrangements are given in the following tabulation:

| Fig. | Capacitance, mfd. | Voltage, volts | Power, watt-seconds |
|---|---|---|---|
| 3a | 100 | 4,000 | 800 |
| 3b | 120 | 6,000 | 2,160 |
| 3c | 480 | 3,000 | 2,160 |
| 3d | 960 | 3,000 | 4,320 |
| 3e | NC | V | $NCV^2/2$ |

It will be noted from the energy formula that the electrical energy available for discharge from the energy bank varies linearly with the capacitance of the storage capacitor, or combinations of storage capacitors, as the case may be, and also varies directly as the square of the voltage of the energy stored. While the energy stored thus varies as the square of its voltage, and increases in energy are thus more readily obtained through increases in the voltage, higher voltages become more increasingly difficult and dangerous to handle. Moreover, energy loses are greater at higher operating voltages, and capacitor ratings, of course, depend upon the voltages employed. For these reasons, it generally has been found more practical and preferable, within limits, to increase the capacitance of the energy bank although the stored energy varies only linearly with this parameter. Under controlled conditions, however, optimum values of both voltage and capacitance parameters may advantageously be combined whereby energy may be stored in and discharged from the energy bank at desired high levels to suit a particular purpose. For example, it will be noted that the same number of capacitors are employed in the energy banks of FIGS. 3b and 3c and the same power output is obtained therefrom, although the capacitor arrangements are different. The arrangement of FIG. 3c, however, has generally been found to produce better metal forming results than FIG. 3b, as will become more fully apparent hereinafter as metal forming apparatus and methods of the present invention are described.

Figure 3F:
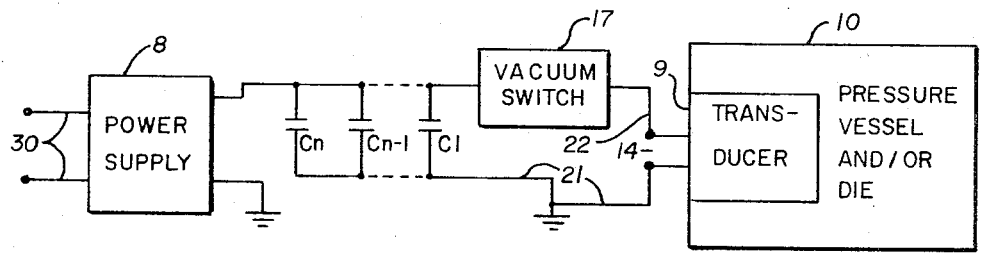
FIG. 3f is a block diagram of the entire system and apparatus for forming metal by electrical discharge.
Figure 4:
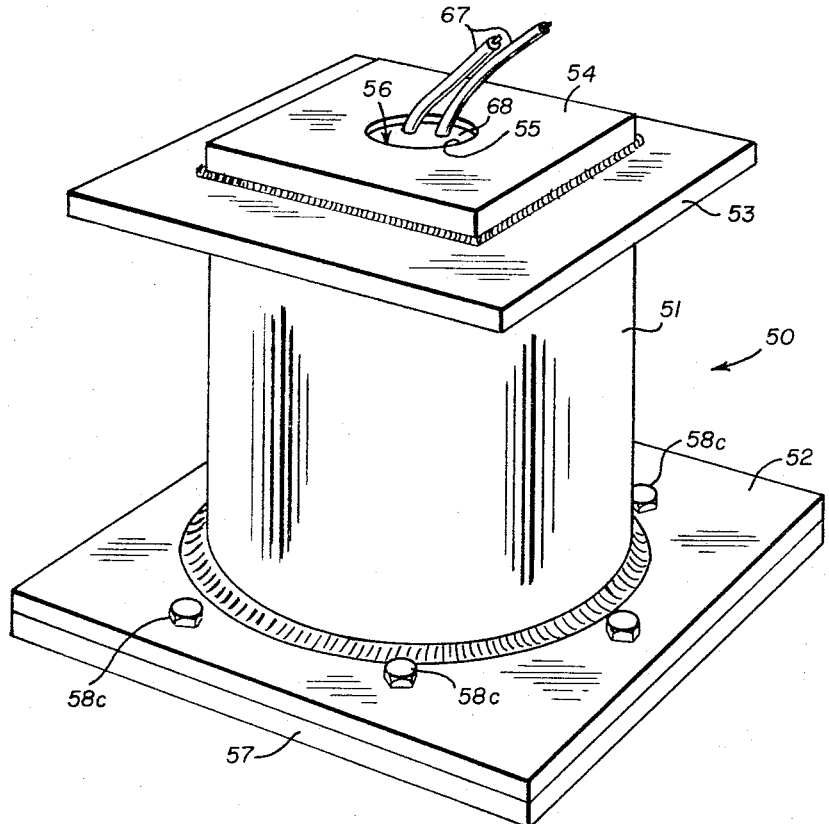
FIG. 4 is a view in perspective of one form of apparatus suitable for practicing the electrical discharge sheet metal forming process of the present invention.

The metal forming apparatus comprises a system, as disclosed in FIG. 3f and including in its entirety, a power supply 8, namely, the charge and discharge control circuits of FIG. 3 for charging capacitor C1, broadly designated as Cn, and discharging the stored energy, by way of the vacuum switch 17, and across the gap between the electrodes of a transducer 9, disposed within a pressure vessel and/or die 10, the gap in the electrodes corresponding to the gap 14 as disclosed in FIGS. 1 to 3. The pressure vessel 10 corresponds to the pressure vessels 50, 100, 100' and 100" as hereinafter described. The transducer 9 corresponds to the transducers 56, 183, 73, 76, 77, and 78 as hereinafter described.

Referring now to FIGS. 4 to 8, there is disclosed thereon, a pressure vessel generally designated 50 which comprises a massive hollow cylinder 51 to which a flange 52 and centrally apertured plate 53 are secured, as by welding, at opposite ends thereof. A plate 54 having a threaded central opening 55 aligned with the central opening of plate 53 is welded thereto and provides mounting support for a transducer generally designated 56. A plate 57 having a plurality of holes 58a arranged for alignment with holes 58b in flange 52, is secured thereto as by bolts 58c and cooperating nuts 58d (FIG. 12). Plate 57 supports a die 59 having a central opening 60 which aligns with a somewhat larger central opening 61 in plate 57. Any suitable means such as screws (not shown) may be employed to secure the die to plate 57. Die 59 has a flat face 62 upon which is mounted and secured as by taping thereto, a metal blank which is to be conformed to the curvature 63 of the die by shock waves generated by electrical discharge of energy from transducer 56 and transmitted to the blank through the medium of water contained within the pressure vessel 50.

Figure 5:
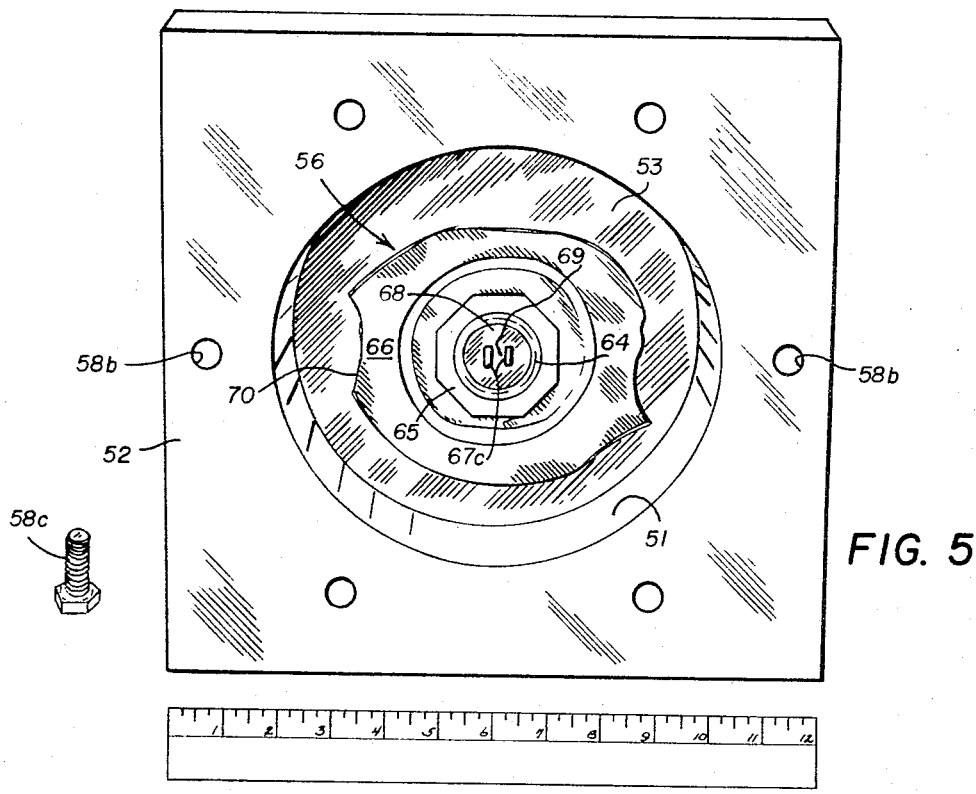
FIG. 5 is a view in perspective showing the interior of the discharge chamber of the apparatus of FIG. 4, the die supporting cover being removed.
Figure 6:
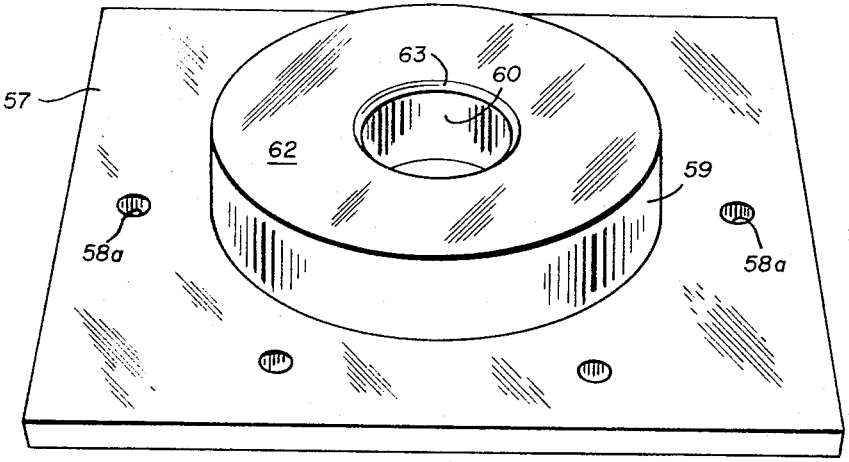
FIG. 6 is a perspective view of the cover and die.

Transducer 56 comprises a tubular body 64, FIG. 7, which is threaded at one end for engagement with the threaded opening 55 in plate 54 and is threaded at the opposite end to receive a nut 65, FIG. 5, for securing a reflector 66 to the tube 64. The end portions of heavily insulated copper conductors or cables 67 are potted or encapsulated within tube 64 as by a suitable dielectric plastic material 68, and the bare tips or ends 67c of the copper conductors are exposed in spaced relation on the inner face of the dielectric material as indicated at 69 in FIG. 5.

The dielectric material may be of any type suitable for the purpose such, for example, as the epoxy resin manufactured and sold under the trade name "Scotchcast" No. 2 by Minnesota Mining and Manufacturing Company, St. Paul, Minn. As used herein, to this resin there preferably is added and admixed therewith 50% by weight of silica with optimum results being obtained by injection of the mixed potting material under vacuum so as to avoid air bubbles in the dielectric material as cast in finished form. The resulting cast material combines good mechanical and thermal shock resistance with high dielectric strength and thus is well adapted to withstand the shock waves which accompany the high level electrical discharge which passes through the water between the copper tips 67c in the region of the resin-water interface. Cracking of the potting material and resulting loss of energy through spurious leakage paths therein are thus avoided.

Figure 9A:
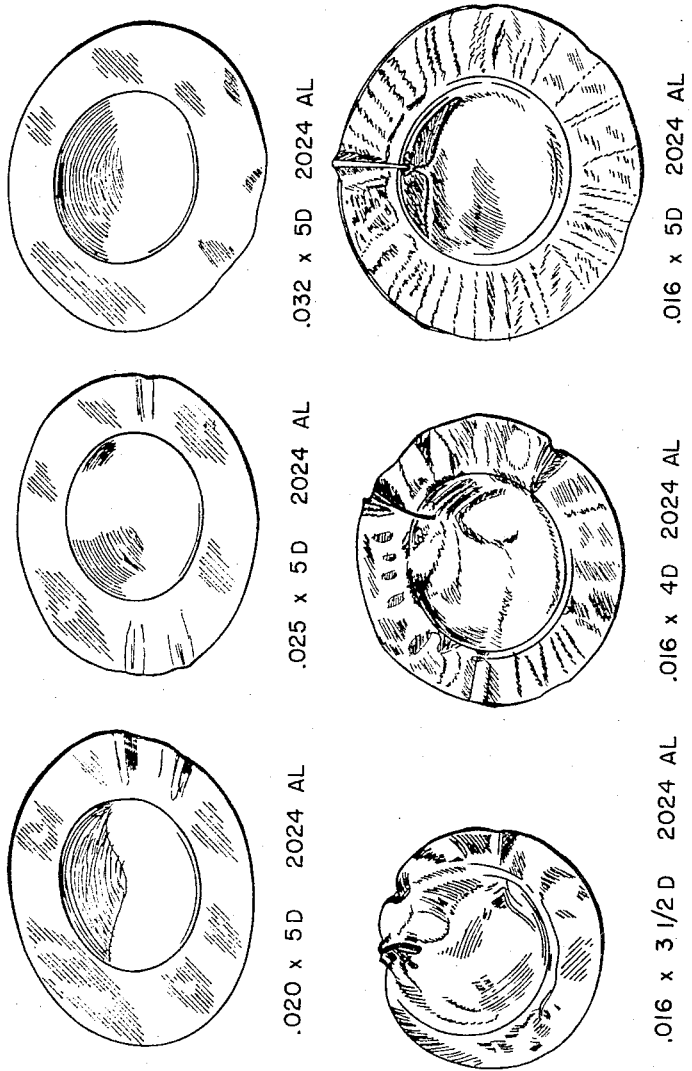

The ragged edge 70 of reflector 66, as seen in FIG. 5, is indicative of the shattering force of the shock waves which are generated within the water as a result of the discharge of electrical energy across the gap between the conductors in the region 69 of their exposed tips at the dielectric face of transducer 56. The effect of the shock waves applied to various sheet metal blanks mounted on surface 62 of die 59 are depicted in FIGS. 9a and 9b which, respectively, display the results of metal forming on opposite sides of several blanks of 2024 aluminum of various gages. These blanks were formed using 400 watt-seconds of power at 2500 volts, the formed concave surfaces disclosed in FIG. 9a being those subjected to the shock waves and formed convex surfaces disclosed in FIG. 9b being those opposed by the pressure of the surrounding air.

The pressure vessel, of course, is filled with water prior to the discharge and is refilled, or replenished, after each metal blank is formed. The shock forces on the perimetrical portions of the blank tend to seal the same against the surface 62 of die 59. However, considerable water losses from the pressure vessel may occur, even when the same is positioned with the die upright, when the perimetrical portions of the blanks become crimped in the forming process, as is most evident in the formation of the lighter gages of the aluminum blanks. It is to be noted that there is no evidence of crimping of perimetrical portions in the case of the heaviest gage aluminum blank, and the die-formed central portion or crown of the formed blanks evinces a uniform application thereto of the shock forces while nevertheless indicating considerable displacement of the metal in the formation area of the blank.

The deeper draws and resultant perimetrical crimping of the lighter gage blanks suggest that a more positive means for holding the blanks in position on the die should be employed. Accordingly, die 59 is shown modified in FIGS. 11 and 13 to carry a pressure plate 71 which is held against surface 62 of die 59 releasably thereagainst as by means of removable thumb screws 72. By this means, the blank to be formed may be inserted and clamped between surface 62 of the die and the pressure plate 71 by tightening the thumb screws 72.

In FIG. 10, the numeral 73 generally designates a form a transducer such as shown in FIGS. 14 to 16 wherein the outer tube 74 is threaded throughout its length so that the transducer may be positioned adjustably within the pressure vessel through selective threaded advancement of the same in engagement with the threaded opening 55 in plate 54. The transducers of FIGS. 14 to 16 are respectively generally designated 76, 77, and 78, it being noted that transducer 76 is disclosed in mounted relation within the open pressure vessel disclosed in FIG. 12.

Referring to FIGS. 12, 14, 17 and 20, it will be seen that transducer 76 comprises a center electrode 79 which is shaped generally in the form of a truncated cone, and an outer hollow, cylindrically shaped electrode 80, both of which are formed of copper or other suitable low resistance metal. Electrode 79 has a central recess 81 for receiving the bared end of a copper cable 67 to which it may be secured as by brazing. Outer electrode 80 similarly has recesses 81 for attachment of the conductor cables in the same manner. These electrodes are maintained concentrically relative to the outer tube 74, as best disclosed in FIG. 20, by means of the dielectric material 68 which occupies the space between electrode 80 and tube 74 as well as the space between the electrodes per se. It will be noted that the end faces of the electrodes and of the dielectric generally lie within the same plane.

In the construction of transducer 77 as disclosed in FIGS. 15, 18 and 21, it will be seen that the inner electrode 82 is of reduced diameter as compared to the corresponding electrode 79 of transducer 76. Its enlarged end 84 has an opening 81, not shown, to connect with a cable. Similarly, the outer electrode 83 is of reduced diameter as compared to the corresponding electrode 80 of transducer 76, and its enlarged opposite end face has one or more conductor-receiving sockets 81, not shown. Electrode 83 has a central opening through which electrode 82 passes with clearance between the electrodes, and the intervening space between the electrodes and between electrode 83 and an inner tube 85 are filled with dielectric material 68 as in the case of transducer 76. Tube 85 is threadedly received within an outer tube 75 which is potted concentrically within and with respect to outer tube 74 by potting material 68 disposed therebetween. In this case, tubes 74 and 75 serve as an adaptor for the assembly including tube 85 and the electrodes potted therewithin whereby the entire assembly may be mounted in the pressure vessel 50 in the same manner as transducers 76 and 78 with provision for additional adjustment of the exposed end faces of electrodes 82 and 83 within the vessel.

The construction of transducer 78 is disclosed in FIGS. 16 and 19 from which it may be seen that the electrodes 86 and 87 are initially formed from a single piece of cylindrical stock in which a deep diametrical wedge-cut 88 has been formed, leaving only a thin end-face portion 89 which, following potting of the electrodes within tube 74 as by the dielectrical material 68, is machined away to leave a gap 90 between the electrodes which is also filled with the dielectric material. Each of the electrodes has a recess 81 to which the electrical cable individual thereto is connected as heretofore described.

FIGS. 20 to 22 are face views of transducers 76 to 78 which pictorially depict the severity of the electrical discharge between the electrodes as evidenced by the regions 91 and 92, for example, of electrode arc erosion which are typical of the deterioration of the electrodes of transducer 76, FIG. 20, after 20 discharges between the electrodes, the discharged energy being at the power level obtainable from the energy storage bank arrangement of FIG. 3a. Similarly, electrode erosion regions 93 and 94 on the electrodes of transducer 77, FIG. 21, are typical of the electrode deterioration which resulted after 20 discharges between the electrodes of transducer 77 when operated under the same conditions of operation of transducer 76, as aforedescribed. Regions 95 and 96 of electrode arc erosion of electrodes 86 and 87 of transducer 78 are typical of the electrode deterioration which resulted after 10 discharges of energy between the electrodes upon discharge from the energy bank arrangement of FIG. 3a, as in the operation of transducers 76 and 77.

Blanks of 2024 aluminum of .016 inch gage were formed in the modified pressure vessel disclosed in FIGS. 12 and 13, except that transducer 78 was used in lieu of transducer 76, and the face of the exposed electrodes was positioned at different distances from the blank being formed. The variation in the extent of formation of these blanks is depicted in FIG. 23 from which it may be seen that the extent of displacement of the metal increases progressively with the distance of the electrodes away from the blank being formed. The bottom blank, unlike the others depicted in FIG. 23, was formed through use of transducer 56 rather than transducer 78 and was spaced the same distance from the electrodes of transducer 56 as the second blank from the top was spaced from the electrodes of transducer 78. From comparison of these two blanks it may be seen that the amount of metal displacement obtained from transducer 78 is more than double that obtained in the use of transducer 56. FIG. 24 similarly depicts the formation of 2024 aluminum blanks of .032 inch gage, it being noted that in this case, the displacement of the metal obtained from the use of transducer 78 is over three times that obtained in the use of transducer 56 under comparable conditions of operation. In FIG. 25 there are disclosed various blanks of 2024 aluminum of different gage thickness which have been formed in the use of transducer 78 with the electrodes thereof spaced 4½ inches from the blank being formed, and otherwise under the same conditions of operation heretofore described in the forming of blanks depicted in FIGS. 23 and 24. From FIG. 25 it will be apparent that the amount of forming or displacement of the metal increases progressively as the gage of the blanks is decreased. It is also to be noted that the forming is uniform, that is, symmetrical about the center of displacement, notwithstanding the extent of displacement of the metal. The shattering effect of the shock waves is to be noted, however, in FIG. 23 wherein the light gage blank which has been subjected to the shock waves at a distance of 6 inches from the electrodes of the transducer face, is ruptured and torn.

Two blanks of 2024 aluminum of .050 inch gage were each formed 4½ inches from transducers 76 and 78 under comparable conditions of operation of pressure vessel 50 modified as disclosed in FIGS. 12 and 13. The difference in displacement obtained in the use of these transducers is disclosed in FIG. 26 from which it may be seen that the greater displacement is obtained in the use of transducer 78. This provides a measure of the intensity of the shock waves applied to the respective blanks, and the apparent difference is attributable to the difference in the transducer design, specifically to the difference in electrode face configuration since all other factors involved are the same. In transducer 78, the space 90 across which the arc occurs is more nearly centered with respect to the transducer-water interface and, accordingly, it is suggestive that the focusing of the shock waves effected by the face of the transducer as obtained from transducer 78 may be better than that obtained from transducer 76.

In view of the foregoing and other considerations regarding focusing, the face of transducer 76 was modified to give the same a 6 inch concave spherical radius. Using transducer 76 modified in this manner, blanks of 2024 aluminum of both .016 and .032 inch gage were formed under conditions comparable to those formed in the use of transducer 78 as depicted in FIGS. 23 and 24, those formed with modified transducer 76 being depicted for gage .016 in FIG. 28 and for gage .032 in FIG. 29. From each of FIGS. 28 and 29 it may be seen that the amount of displacement of the formed crown increases as the distance of the formed blank away from the transducer face is decreased, the shock waves having the greatest intensity at 1½ inches from the face of transducer 76. In FIG. 28, moreover, it may be noted that the intensity of the shock forces applied to the .016 aluminum blank at 1½ inches from the concave face of transducer 76 is sufficient to shatter the same as evidenced by the resultant rupture and tearing of the blank. In this respect, transducer 76 operating at 1½ inches from the blank, as depicted in FIG. 28, gives results comparable to those depicted in FIG. 23 for the blank formed and shattered with the blank spaced 6 inches from the electrodes of transducer 78. It is significant to note, however, that greater displacement of the crown, as produced by transducer 76 at 6 inches from the blank, FIG. 29, is greater than that for transducer 78 spaced 1½ inches from the blank, FIG. 24. The displacement of the crown at 1½ inches from transducer 76, FIG. 29, however, was less than that obtained from the blank spaced 6 inches from the electrodes of transducer 78, FIG. 24. The variation in crown displacement for 2024 aluminum blanks of different gages in the use of transducer 76 with its 6 inch spherical face radius and with the blanks spaced 1½ inches from this face of the transducer is shown in FIG. 30 from which it may be seen, as expected, that the amount of displacement decreases progressively as the gage of the metal is increased.

Transducer 76 was modified to provide its electrode face with a 12 inch spherical concave radius, and various blanks of 2024 aluminum of .020 inch gage were formed at different distances from the transducer face as indicated in FIG. 31 from which it may be seen that the displacement of the crown is substantially uniform for the different positions, there being a slight increase of the order of one-eighth inch as the spacing between the electrode face and the blank is increased from 1½ to 6 inches. The uniformity of forming with the 12 inch concave spherical radius of the electrode face of transducer 76 is depicted diagrammatically in FIG. 31c in comparative relation to the forming variation obtained for the same electrode-blank spacing for other conditions of curvature of the electrode face of transducer 76, the electrode face being flat as in FIG. 31a, having a 6 inch concave spherical radius as in FIG. 31b, and having a 12 inch convex spherical radius as in FIG. 31d. It will be noted in FIG. 31a that the forming of the crown increases as the spacing between the blank and the electrode face increases, the maximum forming occurring at 6 inches from the electrode and the minimum at 1½ inches. In FIG. 31b, the reverse in the order of forming occurs, the maximum forming occurring at 1½ inches from the electrode face and the minimum at 6 inches. In FIG. 31d, the maximum forming occurs at 3 inches from the electrode face, the minimum at 4½ inches, and of the two remaining positions, the greatest forming occurs at 6 inches.

It will thus be seen that by shaping of the electrode face at the interface of the transducer and the surrounding water within the pressure vessel, the intensity of the shock waves which are brought to bear upon the blank to be formed by such shock forces may be controlled or the shock waves focused in relation to the spacing between the blank to be formed and the face of the transducer, it being apparent from FIG. 31b, for example, that concave electrode faces should be used in the forming of parts which have a small displacement area. Similarly, FIG. 31a tends to suggest that a flat electrode face be employed in the case of parts to be formed having a large displacement area. From FIG. 31c it is apparent that shaping of the transducer-water interface of the electrodes may also be employed to control or focus the shock waves such that the forming produced thereby may be rendered substantially independent of the spacing of the blanks with respect to the electrode face.

Two 2024 aluminum blanks of .020 gage were stacked together and formed by one electrical discharge in the apparatus of FIGS. 12 and 13. The resulting forming of these parts is depicted in FIG. 27 from which it may be seen that their forming is substantially identical, the inner blank being virtually coined into the outer blank.

Electric discharge forming of metals has particular utility in the forming of metal tubes into desired configuration. In FIGS. 32, 33 and 34 there is disclosed a pressure vessel, generally designated 100, for forming a metal tube 101. Pressure vessel 100 comprises a massive hollow aluminum cylinder 102 which is recessed at 103 to interfittingly receive the annular projection 104 from the face of a centrally apertured plate 105 which is received in matching engagement with one end face of cylinder 102. The central opening in plate 105 is threaded as at 106 for threaded engagement with transducer 77 which, for this purpose, is comprised only of innertube 85 and electrodes 82 and 83 potted therewithin. The other end face of cylinder 102 receives a closure plate 107 in face adjacency therewith, and this closure plate has a threaded central water filler opening for receiving a threaded closure plug 108. This end face of cylinder 102 is recessed as at 109 to receive an O-ring 110 for sealing tube 101 at that end of the pressure vessel, tube 101 being supported within cylinder 102 at this end by the inner surface 111 of the cylinder which conforms to the outer surface of tube 101. The other end of tube 101 is supported by the central opening in plate 105 which, for this purpose, is somewhat enlarged as at 112 from its threaded opening 106. Surface 112 is recessed as at 113 to receive an O-ring 114 for sealing this end of tube 101. Surface 112 is also rounded as at 115 to merge with the face of projection 104 which, as aforementioned, seats in recess 103 in cylinder 102.

To provide for diametrical and circumferential expansion of tube 101 in response to an electrical discharge from transducer 77 which is directed internally of the tube, the same being filled with water received by way of the filler opening which, as aforementioned, is closed by plug 108, the inner surface 111 of cylinder 102 is enlarged, as indicated at 116, to the limit of expansion desired in the formation of tube 101. Surfaces 111 and 116 are shown joined by a tapered surface 117 which, in the formation of tube 101 into a production part, is not considered critical. However, the parts to be formed will have an ultimate configuration which is represented by surfaces 111, 115, 116, and 117 and the ability of the tube 101 to conform to this exemplary configuration is indicative of the success of forming of the part by means of electrical discharge within the enclosed body of water within tube 101.

Surfaces 116 and 117 of cylinder 102 and curved surface 115 of plate 105 comprise the conforming surfaces of the pressure vessel considering the same as a die, and the chamber 118 formed by these surfaces in conjunction with the outer surface of tube 101 is normally open to the atmosphere with which it is in communication by means of one or more openings 119 in cylinder 102. Plate 105 has a plurality of holes (not shown), such as holes 120 provided in plate 105' of FIG. 46, for receiving screws, such as screws 159 disclosed for use in securing plate 107' of FIG. 48, which screws are threadedly receivable in a plurality of matching threaded openings 121 in cylinder 102, as may be seen in FIG. 48. Plate 107 is similarly fastened (not shown) to the other end of cylinder 102.

In FIG. 36 there is shown a pair of rough-welded 2024 aluminum tubes initially 2½ inches in outside diameter in which each of the tubes was expanded to 3¼ inches outside diameter which corresponds to the die surface 116 of pressure vessel 100. It will be noted that the two tubes have been formed identically except that the tube on the right evidences some tearing in the region of the weld. It will also be noted that there is an apparent lack of complete forming in the region 122 which, but for the incomplete forming, would otherwise have conformed to the tapered surface 117 of cylinder 102. The coining of the tube into the mouth of air vent 119 as at 123 is significantly indicative of the force with which the metal is blasted into the surfaces of the die. In the six times magnification of the expanded tube surface in the region of protuberance 123, as disclosed in FIG. 37, reproduction of the tool marks in the die surface are plainly manifested, for example, as indicated at 124.

There was a low order of sound in the forming of the parts disclosed in FIG. 36 in the closed test vessel 100 although the coining of the parts as aforedescribed unquestionably manifests the high intensity of the shock forces involved. The energy used for this purpose was supplied by the energy storage bank disclosed in FIG. 3a. Air trapped in the die is accountable for the incomplete forming of the parts in the region 122. The parts, however, evidence little or no thinning, but, it is significant to note that the tube length shortened by ⅜ inch, and it is also significant that the region 125 of each of the formed tubes conforms substantially to the curved surface 115 of plate 105. The edge portion 126, however, apparently remained in seated relation on the tube support surface 112, this apparently by virtue of the water pressure on the inner surface of tube 101 in the region of surface 112 notwithstanding that this end of the tube moved slidably along the surface as the tube shortened.

A modification of pressure vessel 100 is disclosed in FIG. 38, wherein the vessel is designated 100', and provides for evacuation of the chamber 118 between the die surfaces and tube 101. For this purpose, the engaging surfaces of plate 107 and cylinder 102 are sealed by an O-ring 127 inserted in a recess 128 formed in the end surface of cylinder 102. Similarly, the opposite end face of cylinder 102 is sealed by an O-ring 129 inserted in a recess 130 formed therein. Air duct 119 is fitted as at 132 to a vacuum line including valves 133 and 134 and an intermediate vacuum gage 135.

In the operation of test vesssel 100', valves 133 and 134 are opened and evacuation of chamber 118 continued until vacuum gage 135 indicates a desired degree of vacuum of the order of 28 inches of mercury. Valve 134 is then closed so that gage 135 may be observed for possible loss of vacuum through leakage in the pressure vessel system. With a desired degree of vacuum achieved and maintained, valve 133 is closed to protect gage 135, and test vessel 100 is then ready for metal forming operation, as before. The configuration of parts formed in modified pressure vessel 100' of FIG. 38 evidenced little change over those parts disclosed in FIG. 36 which are formed in the unmodified pressure vessel although no sound was detectable due to the vacuum.

A further modification of pressure vessel 100' is disclosed in FIGS. 39 and 40 wherein the same is designated 100", to make provision for mounting of the transducer in either end of the pressure vessel. To this end, the central opening in plate 107 is enlarged to provide a threaded opening 136 conforming to that of 106 in plate 105 thus accommodating transducer 77 in plate 107 as disclosed in FIGS. 39, plate 107 as so modified being designated 107'. An enlarged plug 137 having a central threaded opening for accommodating water filler plug 108 comprises means for sealing the opposite end of pressure vessel 100", and an O-ring 138 preferably is employed to increase the effectiveness of the plug for this purpose.

In the operation of pressure vessel 100", transducer 77 was positioned such that the electrode face designated 141 in FIG. 39 was placed well within tube 101. With the chamber 118 under vacuum and with electrical discharges supplied from the energy storage bank of FIG. 3a, welded 5052 aluminum tubes of .016" gage split open with very little forming. The same type of tubes of .035 inch gage did not form completely but took on a coke-bottle shape such as indicated by the dashed lines 101' in FIG. 39. Tubes of .016 inch gage formed of commercially pure titanium and 301 and 321 stainless steel of the same gage all gave the same results of which that typically obtained for a 321 stainless tube is depicted in FIG. 41.

Referring to FIG. 41, the corresponding die surfaces are indicated by the dashed lines designated 116' and 117' which, in comparison with the incompletely formed surface 140 of the tube, indicates the extent of forming which has been achieved. The expanded end portion 142 was duplicated in every tube formed of all types and is suggestive of a cavity resonant condition in the die productive of reflected shock wave energy in the region 142 of the tube.

This cavity resonant condition is utilized in the pressure vessel arrangement of FIG. 40 wherein an enlarged chamber 143 is interposed between plug 137 and pressure vessel 100", and an additional O-ring 144 is employed between the plug 137 and chamber 143 to maintain the sealed integrity of the pressure vessel system. A stainless steel part, such as was used to form the expanded tube disclosed in FIG. 41, was formed in the pressure vessel system of FIG. 40, and the shape imparted to this tube as a result of the forming operation is depicted in FIG. 42 from which it can be seen that as a result of the cavity resonant condition produced by the increased volume of the chamber 143, the part is fully formed in the region 117' corresponding to the region 117 of the die and is generally formed to a greater extent than was obtained in the comparable part disclosed in FIG. 41. It will be significantly noted, moreover, that the characteristic hump in the region 142 of the tube of FIG. 41 is completely absent in the formation of the tube disclosed in FIG. 42, and the incompletely formed surface 145 of the tube discloses comparatively the extent of formation achieved. Similarly, the dashed lines 101" in FIG. 40 comparatively disclose the formation achieved in relation to the die configuration 116 and 117.

FIGS. 43 to 45 are views depicting the formation of an aluminum part which has been formed in the pressure vessel 100" of FIG. 39 with an electric discharge supplied from the energy storage bank arrangement of FIG. 3b which, it will be recalled, is operated at a working voltage of 6000 volts. As may be seen from FIG. 43, the tube is fully formed to the die configuration up to the line 146 where it has been trimmed in the expanded region of the tube, it being noted that the expansion represents a diametrical increase of from 2½ to 3¼ inches. In FIG. 44, which is an enlarged view looking into the expanded end of the tube disclosed in FIG. 43, protuberances such, for example, as those depicted at 147 and 148 evidence the presence of water droplets on surface 117 of the die. In FIG. 45 which is a view at six times magnification taken externally of the part disclosed in FIG. 43, concavities or depressions 149 and 150 typically evidence the presence of the water droplets on the surface of the die. Lines 151 are also typical of the reproduction of tool marks in the die surface.

A modification of end plate 105 designated 105' in FIG. 46, provides a relief of the die surface 115 which is conducive to cracking or tearing of the tubes during forming as aforedescribed in connection with the showing of the tubes disclosed in FIG. 36, one of which is torn at the weld at this end of the tube. Also typical of the wrinkled edge resulting from forming of the end portion of the tube in contact with die surface 115, is a copper part disclosed in FIG. 49 which clearly evidences the wrinkled edge 152. This copper part was fully formed in the die arrangement of FIG. 39 with an electrical discharge supplied from the capacitor arrangement of FIG. 3c.

In FIG. 46, a portion of plate 105' in the region of tube support surface 112 and projection 104 is cut back to the longitudinal and transverse surfaces 153 and 154, respectively, with the result that parts formed in test vessel 100", FIG. 39, and employing end plate 105' are produced with a less severely stressed edge 155 as disclosed in FIG. 50. In FIG. 50, the aluminum part depicted therein, like the copper part depicted in FIG. 49, was formed with an electric discharge supplied from the capacitor arrangement of FIG. 3c. It will be noted that this same general end configuration 155 has also been formed in the stainless steel part disclosed in FIG. 51. This part, however, was formed in the modified pressure vessel disclosed in FIGS. 47 and 48 wherein the pressure vessel 100" provides no external support for the tube 101 to be formed in the expandable end portion of the tube. The support and sealing arrangement for this end of the tube is provided internally thereof by a strap type of end plate for cylinder 102 which is generally designated 156.

Plate 156 comprises a diametrical portion or strap 157 having holes 158 for receiving screws 159 for attaching plate 156 to cylinder 102, suitable inserts 160 being employed to provide the proper spaced relation between strap 157 and end plate 107' as required to accommodate the length of tube 101.

Plate 156 also has a centrally disclosed circular portion 161 having an annular surface 162 which is received generally interfittingly within tube 101. This surface is recessed as at 163 to receive an O-ring 164. Recess 163, in turn, terminates in a reduced annular surface 165 from which diametrically disposed water channels or passages 166 extend to the central opening 167. Central opening 167 is a continuation of a threaded opening 168 in strap 157 for accommodating the water filler plug 108.

In the operation of pressure vessel 100" (FIG. 48), transducer 77 is adjustably positioned in plate 107' and tube 101 is supported in sealed relation on this plate and with respect to cylinder 102 by the O-ring 110. Plate 156 is mounted on the other end of cylinder 102 with the central portion 161 projecting into tube 101 in sealed relation therewith as effected by the O-ring 164. The remaining unoccupied space within tube 101 is then filled with water admitted by way of openings 168 and 167 after which the chamber is closed with the filler plug 108. In this arrangement, the die chamber 118 is directly open to atmospheric pressure in the annular region 169 which surrounds the tube at this end.

Tube 101 as disclosed in FIG. 48 represents the stainless steel part depicted in FIG. 51 prior to its forming in the pressure vessel. This part was hit with an electrical discharge supplied to transducer 77 from the energy storage bank of FIG. 3d. In the first application of this energy, the resulting shock waves in the water forced tube 101 into the intermediate position indicated by the dashed lines 170 in FIG. 48. Following this displacement plug 103 was removed and the supply of water was replenished and plug 108 again inserted to seal the body of water within the partially formed tube. In a second electrical discharge and an application of the resultant shock waves to the partially formed part through the medium of the body of water contained therewithin, the part was fully expanded into conformance with the die surfaces involved as is evidenced by the fully formed showing of this part as depicted in FIG. 51.

In FIG. 52, wherein a portion of the external surface of the part of FIG. 51 is disclosed at several times magnification to manifest surface effects resulting from the formation of the metal into the configuration of the die, tooling marks in the machining of the die are clearly evidenced in the surface of the stainless steel part as indicated, for example, at 171 and 172. This clearly manifests a coining of the stainless steel into the softer aluminum of which the die is formed, as aforedescribed. Also related to this significant coining phenomenon of a harder metal into the surface of a softer metal is the complete apparent lack of spring back in the generally resilient stainless steel. This lack of spring back and coining of the stainless steel into the surface of the die configuration of the aluminum is manifested by the extreme difficulty encountered in removing the formed part from the die.

The aforedescribed lack of spring back and coining of the parts within the die are suggestive of other applications of the metal forming or working process heretofore described such, for example, as mechanical joining involving the swedging of the tubes, the making of ball joints and the crimping and attaching of flange fittings. Of further utility, for example, is the related operation of dimpling of high strength, brittle material and the sizing of stamping type parts. The process, moreover, has natural utility in such other operations as blanking and piercing.

Referring now to FIG. 53, the stainless steel part of FIG. 51 is disclosed in comparative relation to a conventionally formed part of which the part formed by the process herein disclosed is the equivalent in the regions of critical dimensions. The conventionally formed part is generally designated 173 and comprises two generally identical half-stampings 174 and 175 which are welded together as at 176 and 177. The weld is ground away in the expanded region of the tube as indicated at 178 to accommodate a flange which is to be secured to the expanded tube. The corresponding part formed by the process of the present invention is generally designated 180.

The following tabulation comparatively discloses the steps involved in making the conventional part 173 in relation to the steps involved in forming the finished part 180 in accordance with the electric discharge forming process of the present invention.

Conventional part 173:
(1) Stamp 2 halves of tube
(2) Rough trim
(3) Chisel weld
(4) Trim for weld
(5) Weld complete
(6) Expand both ends to finish dimension
(7) Grind weld to clear fitting
(8) Weld fitting
(9) End trim Part 180:
(1) Trim tube to length
(2) Expand tube
(3) Weld fitting
(4) Trim The following tabulation comparatively indicates the variation in thinning of the metal walls of tubes 173 and 180 in the regions A, B, and C.

|  | A | B | C |
|---|---|---|---|
| Tube 173 | .020 | .012–.014 | .020 |
| Tube 180 | .016 | .0145 | .016 |

Referring now to FIG. 54, there is disclosed therein a pressure vessel 100' which is generally similar to that disclosed in FIG. 38 except that an adaptor 182 is threaded into the opening 106 of plate 105 and an elongated transducer generally designated 183 is threadedly mounted in a threaded central opening of the plug 182. Transducer 183 comprises an outer threaded tube 184 and a centrally disposed copper electrode rod 185 which is relieved as at 186 to secure the same against axial movement with respect to tube 184 within which it is potted and encapsulated as by the dielectric plastic 187 which may be the same as dielectric material 68 heretofore described. Rod 185 carries a suitable terminal 188, and at the other end barely emerges at the transducer-water interface 189. A second elongated copper electrode generally designated 190 and having a threaded portion 191 is received in a threaded opening 192 in end plate 107″. Electrode 190 comprises a terminal 193, and at the opposite end comprises a reduced rod portion which terminates in a tip 194 in confronting relation to the tip 195 of electrode 185.

The operation of the pressure vessel and die arrangemetn of FIG. 54 is generally the same as heretofore described in connection with the other embodiments. Electrode assembly 183 and electrode 190, however, have the advantage in that the electrode tips 194 and 195 may be adjustably positioned and spaced axially with respect to each other to effect variations in the electrical discharge therebetween. Similarly, once a desired spacing has been set between the electrode tips as aforedescribed, this spaced relation may be maintained for several positions of adjustment of the electrodes along the axis of tube 101 to affect various directive effects of the generated shock waves in relation to the portions of tube 101 to be expanded into conformity with the die configuration 116 and 117.

From the foregoing, it should now be apparent that an electrical discharge method and apparatus for forming metals with exemplary embodiments and variations has been provided which is well adapted to fulfill the aforestated objects of the invention. It is to be understood, however, that the invention may be embodied in other forms or carried out in other ways without departing from the spirit or essential characteristics thereof. For example, the static pressure of the body of water partially enclosed by the part to be formed may be increased short of the yield point of the material of which the part is formed, thus requiring shock wave forces sufficient only to displace the material into the die. The embodiments of the invention heretofore disclosed, therefore, are to be considered as in all respects illustrative and not restrictive, the scope of the invention being indicated by the appended claims and all changes which come within the meaning and the range of equivalency of the claims are intended to be embraced therein.

Having thus described my invention, what I claim is new and useful and desire to secure by Letters Patent is:

1. The method of generating explosive simulating shock waves within a body of conductive water comprising the steps of capacitively storing electrical energy at a level comparable to the potential energy of explosives and at a predetermined voltage level relative to the conductivity of a predetermined virtual short circuit water path within said body of water, and discharging said stored electrical energy at will through a non-inductive circuit including said water path and at a rate of discharge sufficient to generate said shock waves within the water.

2. The method of generating explosive simulating shock waves comprising the steps of capacitively storing upwards of 100 watt-seconds of electrical energy at a level of upwards of 1000 volts, and discharging said energy at will and through a non-inductive path including a virtual short circuit in a body of electrically conductive water and at a rate of discharge sufficient to generate said shock waves therewithin.

3. The method of generating explosive simulating shock waves within an electrically conductive body of water comprising the steps of establishing a non-inductive discharge circuit including a predetermined virtual short circuit path within the water, capacitively storing upwards of 100 watt-seconds of electrical energy at a level of upwards of 1000 volts outside said body of water, and discharging said energy at will through said circuit and path and at a rate of discharge sufficient to generate gas bubbles and accompanying explosive simulating shock waves within the water.

4. The method of generating explosive simulating shock waves within an electrically conductive body of water, comprising the steps of capacitively storing outside said body of water upwards of 100 watt-seconds of electrical energy at a level of upwards of 1000 volts, establishing a non-inductive discharge circuit for said capacitively stored energy including a predetermined virtual short circuit path for said energy at a predetermined location within the body of water, and transferring said stored energy at will by discharge thereof through said circuit and path and for dissipation within said short circuit path and at a rate of discharge therethrough sufficient to generate gas bubbles and accompanying explosive simulating shock waves within the water.

5. The method of generating explosive simulating shock waves within an electrically conductive body of water, comprising the steps of capacitively storing outside said body of water upwards of 100 watt-seconds of electrical energy at a level of upwards of 1000 volts, establishing a non-inductive discharge circuit for said capacitively stored energy including a virtual short circuit water path of predetermined length for dissipation of said energy at a predetermined location within the body of water, and completing at will and in a vacuum said discharge circuit for transferring said stored energy for discharge through said water path at a rate of discharge therethrough sufficient to generate gas bubbles which rapidly expand and contract with accompanying explosive simulating shock waves within the water.

6. The method of generating explosive simulating shock waves comprising the step of discharging at will a source of capacitively stored electrical energy of the order of upwards of 800 watt-seconds through a non-inductive discharge circuit including a fluid-shorted path disposed within an at least partially enclosed body of electrically conductive fluid.

7. The method as in claim 6, said fluid being electrically conductive water, said discharge circuit having capacitance C and inductance L comprised principally of said capacitive energy source, and resistance R comprised principally of said shorted path, said energy ($E=P$) having current (I) and voltage (V) relationships expressed by the electrical laws $$E=\frac{CV^2}{2}=P=I^2R$$

and the time of said discharge conforming to the time constant expressions $T=RC$ and $T=L/R$.

8. The method of generating explosive simulating shock waves within a body of electrically conducting water comprising the step of discharging at will a source of capacitively stored electrical energy of the order of upwards of 800 watt-seconds through a non-inductive series RLC circuit operating at or near resonance and including a water-shorted path within said body of water, said path constituting substantially the entire resistance R of said circuit, said source constituting substantially the entire inductance L and capacitance C of said circuit.

9. The method of generating rapidly expanding and contracting gas bubbles and resultant explosive simulating shock waves within an at least partially enclosed body of electrically conductive water which comprises the steps of immersing a pair of mutually electrically insulated electrodes in said body of water, exposing mutually spaced surfaces of said electrodes to the water, connecting said electrodes in a non-inductive discharge circuit, and discharging at will upwards of the order of 800 watt-seconds of capacitively stored energy through said circuit and across the conductive water gap between said electrode surfaces.

10. The method of forming production parts with shock waves which comprises the steps of at least partially closing an enclosed body of water with a surface of a part to be formed, varying the volume of said body of water to resonate the same relative to a predetermined wave length of said shock waves, and discharging at will capacitively stored electrical energy of explosive level of intensity and steep wave front corresponding to said wave length within said body of water in predetermined spaced relation to the water-part interface whereby said shock waves are directed and applied to said interface with maximum intensity.

11. The method as in claim 10 and further characterized by discharging said electrical energy through a non-inductive circuit including a water-shorted path within said body of water.

12. The method as in claim 11 further characterized by operating said discharge circuit at or near resonance.

13. The shock wave method of forming sheet metal of thin gage comprising the steps of at least partially enclosing an enclosed body of electrically conductive water with a portion of one surface of the sheet metal, immersing a pair of mutually electrically insulated electrodes in said body of water, exposing mutually spaced surfaces of said electrodes to the water and in predetermined spaced relation to the watersheet interface of said surface portion of the sheet metal and discharging at will capacitively stored electrical energy within and across the water gap between said electrode surfaces and said body of water with sufficient explosive level of intensity and steep wave front to generate explosive simulating shock waves within the water, and focusing said shock waves on said interface with maximum intensity to forcibly displace the sheet metal into predetermined configuration, characterized by disposing said electrode surfaces within an electrode-water interface having a radius of curvature critically related to said maximum intensity of the focused shock waves.

14. The method as in claim 13, said radius of curvature being large for large areas of displacement of said sheet metal and being small for small areas.

15. The method as in claim 14, said radius of curvature having a critical predetermined intermediate value providing uniform focusing of the shock waves on said water-sheet interface for variable spacing between said water-sheet and electrode-water interfaces.

16. Apparatus for forming sheet metal parts with shock waves comprising a pressure vessel having a body of electrically conductive water contained therein, means mounting a part to be formed in said pressure vessel so that a portion of one surface of the metal part partially contains said body of water, a transducer mounted on said pressure vessel and having an electrode-water interface disposed in predetermined spaced relation to the part-water interface, said electrode-water interface comprising spaced electrode surfaces and a surrounding dielectric surface, and means for shorting and discharging at will capacitively stored electrical energy across the water gap between said electrode surfaces with sufficient explosive level of intensity and steep wave front to generate explosive simulating shock waves in the water for displacing said sheet metal portion into predetermined configuration, said electrical discharge means comprising a non-inductive discharge circuit including said spaced electrode surfaces, an energy storage capacitor bank having said energy stored therein, and a vacuum switch connecting said capacitor bank and one of said spaced electrodes for transferring said stored energy from said energy storage bank to said water gap, means for charging said energy storage bank, and high speed relay means for disconnecting the charging means from the energy bank thereby to protect the same from back surges of energy in response to shorting of said stored energy across said gap.

17. Apparatus for forming sheet metal parts with shock waves comprising a pressure vessel having a body of electrically conductive water contained therein, means mounting a part to be formed in said pressure vessel so that a portion of one surface of the metal part partially contains said body of water, a transducer mounted on said pressure vessel and having an electrode-water interface disposed in predetermined spaced relation to the part-water interface, said electrode-water interface comprising spaced electrode surfaces and a surrounding dielectric surface, and means for shorting and discharging at will capacitively stored electrical energy across the water gap between said electrode surfaces with sufficient explosive level of intensity and steep wave front to generate explosive simulating shock waves in the water for displacing said sheet metal portion into predetermined configuration, said electrode-water interface having a radius of curvature critically related to said spacing between said part-water and electrode-water interfaces for optimum focusing of said shock waves on said part.

18. Apparatus for forming sheet metal parts comprising means for mounting a part to be formed in spaced relation to the forming surfaces of a die, means for shorting and discharging at will capacitively stored electrical energy of shock wave forming intensity and rate of discharge in a body of electrically conductive water partially enclosed by said part, and forcing said part into conformity with said die surfaces by explosive simulating shock waves generated in the water in response to said electrical discharge therein and transmitted to the part through the medium of the water, said part to be formed comprising a tube to be expanded to predetermined configuration, said mounting means comprising means for supporting one end portion of said tube externally thereof and water-sealing said end of the tube, said mounting means comprising means for supporting the other end portion of the tube internally thereof for axial movement of the tube upon expanding and for water-sealing said end of the tube.

19. Apparatus as in claim 18, said electrical discharge means comprising a transducer including electrodes mounted in at least one of said tube supporting means and extended into said tube, said transducer electrodes having spaced surfaces exposed to the water and comprising a gap for the discharge of the electrical energy thereacross.

References Cited

UNITED STATES PATENTS

| | | | |
|---|---|---|---|
| 781,619 | 1/1905 | Rogers | 113—44 |
| 939,702 | 11/1909 | Jones | 113—44 |
| 1,152,697 | 9/1915 | Bodde | 340—12 |
| 1,784,303 | 12/1930 | Millikan et al. | 317—11 |
| 1,836,397 | 12/1931 | Rieber | 340—6 |
| 2,064,911 | 12/1936 | Hayes | 340—9 |
| 2,168,206 | 8/1939 | Hastings | 313—141 X |
| 2,269,682 | 1/1942 | Paulson | 313—131 X |
| 2,299,941 | 10/1942 | Townsend | 317—151 X |
| 2,559,227 | 7/1951 | Rieber | 340—12 |
| 2,608,186 | 8/1952 | Hudson | 313—38 |
| 2,931,947 | 4/1960 | Fruengel | 315—111 |
| 2,935,038 | 5/1960 | Chatten | 113—44 |
| 2,969,758 | 1/1961 | Howlett et al. | 113—44 |
| 3,007,133 | 10/1961 | Padberg | 340—12 |
| 3,065,720 | 11/1962 | Rardin | 113—44 |

FOREIGN PATENTS

| | | |
|---|---|---|
| 742,460 | 12/1955 | Great Britain. |

OTHER REFERENCES

Martin, E. A.: "The Underwater Spark, An Example of Gaseous Conduction at About 10,000 Atmospheres," Univ. of Mich. Eng. Res. Inst., Ann Arbor, Mich. (UMN–2048–12–F), July 1956, pp. 5, 6, 8, 23, 64, 70–78, 82, 109, 173, 174, 187–190.

"Hydrospark Forming," The Tool Engineer, March 1960, pp. 81–86.

"Explosives Form Space Age Shapes, Steel," Aug. 25, 1958, pp. 82–86, "Spark-Bomb Method Promises In-Plant Explosive Forming" Space Aeronautics, vol. 32, No. 2, February 1960, pp. 99–101.

"Explosive Forming," American Machinist, June 15, 1959, vol. 103, No. 12, pp. 127–138.

"The Tool Engineer II," vol. 45, No. 1, July 1960, p. 142.

"Materials in Design Engineering," vol. 49, No. 2, February 1959, pp. 82 and 83.

"Mechanical Engineering," vol. 81, No. 11, November 1959, p. 77.

"The Power Application Vacuum Switch," by R. W. Sorensen, Electrical Engineering, vol. 77, February 1958, pp. 150–154.

Martin, E. A.: "The Underwater Spark: An Example of Gaseous Conduction at About 10,000 Atmospheres," Univ. of Mich. Eng. Res. Inst., Ann Arbor, Mich. (UMN–2048–12F), July 1956, pp. 27, 47 and 48.

RICHARD J. HERBST, *Primary Examiner.*

NEDWIN C. BERGER, WHITTMORE A. WILTZ, CHARLES W. LANHAM, *Examiners.*

K. A. COCKS, T. D. SHAFFNER, *Assistant Examiners.*